(12) United States Patent
Hung et al.

(10) Patent No.: US 12,039,125 B1
(45) Date of Patent: Jul. 16, 2024

(54) TOUCH SYSTEM

(71) Applicant: ILI TECHNOLOGY CORP., Hsinchu County (TW)

(72) Inventors: Chia-Yu Hung, Hsinchu County (TW); Chun-Yu Jiang, Hsinchu County (TW); Yifan Lin, Hsinchu County (TW); Jui Hua Yeh, Hsinchu County (TW); Jie-An Chen, Hsinchu County (TW); Nai Cheng Li, Hsinchu County (TW); Chi An Jen, Hsinchu County (TW)

(73) Assignee: ILI TECHNOLOGY CORP., Hsinchu County (TW)

( * ) Notice: Subject to any disclaimer, the term of this patent is extended or adjusted under 35 U.S.C. 154(b) by 0 days.

(21) Appl. No.: 18/301,265

(22) Filed: Apr. 17, 2023

(51) Int. Cl.
*G06F 3/044* (2006.01)
*G02F 1/1333* (2006.01)
*G06F 3/041* (2006.01)

(52) U.S. Cl.
CPC ...... *G06F 3/04162* (2019.05); *G02F 1/13338* (2013.01); *G06F 3/0412* (2013.01); *G06F 3/0443* (2019.05)

(58) Field of Classification Search
CPC .................................................. G06F 3/03545
See application file for complete search history.

(56) References Cited

U.S. PATENT DOCUMENTS

| | | | |
|---|---|---|---|
| 2016/0062519 A1* | 3/2016 | Park | G06F 3/0446 345/173 |
| 2016/0162101 A1 | 6/2016 | Pant et al. | |
| 2017/0177145 A1 | 6/2017 | Hara et al. | |
| 2018/0188836 A1 | 7/2018 | Park | |
| 2019/0171320 A1 | 6/2019 | Kim et al. | |
| 2023/0027365 A1 | 1/2023 | Vandermeijden et al. | |
| 2023/0061297 A1* | 3/2023 | Peretz | G06F 3/0383 |
| 2023/0280843 A1* | 9/2023 | Chang | G06F 3/03545 345/179 |

FOREIGN PATENT DOCUMENTS

| | | |
|---|---|---|
| CN | 111090352 | 5/2020 |
| CN | 115904121 | 4/2023 |
| TW | 202016700 | 5/2020 |

OTHER PUBLICATIONS

"Office Action of Taiwan Counterpart Application", issued on Feb. 5, 2024, p. 1-p. 14.
"Office Action of Taiwan Related Application, Application No. 112114185", issued on Feb. 6, 2024, p. 1-p. 14.

* cited by examiner

Primary Examiner — Nan-Ying Yang
(74) Attorney, Agent, or Firm — JCIPRNET

(57) ABSTRACT

A touch system is provided. The touch system includes a touch tool and a touch panel. The touch tool provides a downlink signal. The touch panel obtains a first sensing area sensed with the touch tool, and obtains a second sensing area other than the first sensing area according to the downlink signal. The touch panel provides a first uplink signal to the first sensing area, and provides a second uplink signal to the second sensing area. The first uplink signal is different from the second uplink signal. The touch tool generates a calculated uplink signal according to the first uplink signal and the second uplink signal, and provides the downlink signal according to the calculated uplink signal.

18 Claims, 23 Drawing Sheets

TOUCH SYSTEM

BACKGROUND

Technical Field

The disclosure relates to a touch system, and in particular to a touch system including a touch tool and a touch panel.

Description of Related Art

FIG. 1 is a schematic diagram of an operation of a conventional touch system. A conventional touch system 10 may include a touch tool 11 (for example, a stylus) and a touch panel 12. A user holds the touch tool 11 to perform operations such as writing and drawing on the touch panel 12. The touch tool 11 may receive an uplink signal provided by the touch panel 12, and provide a downlink signal according to the uplink signal. The touch panel 12 obtains a sensing area RA of the touch tool and the touch panel according to the downlink signal.

However, when the palm, finger, or wrist of the user approaches or contacts the touch panel 12, the uplink signal is coupled to the touch tool 11 through a sensing area RB and the palm, finger, or wrist. The uplink signal from the sensing area RB is regarded as noise. The uplink signal from the sensing area RB reduces the analysis ability of the touch tool 11 for the uplink signal from the sensing area RA. Therefore, the touch tool 11 may not be able to correctly provide the downlink signal.

SUMMARY

The disclosure provides a touch system, which can maintain the analysis ability of a touch tool for an uplink signal.

A touch system of the disclosure includes a touch tool and a touch panel. The touch tool provides a downlink signal. The touch panel obtains a first sensing area sensed with the touch tool and a second sensing area other than the first sensing area according to the downlink signal. The touch panel provides a first uplink signal to the first sensing area, and provides a second uplink signal to the second sensing area. The touch tool generates a calculated uplink signal according to the first uplink signal and the second uplink signal, and provides the downlink signal according to the calculated uplink signal. The first uplink signal is different from the second uplink signal.

A touch system of the disclosure includes a touch tool and a touch panel. The touch tool provides a downlink signal according to a first uplink signal. The touch panel includes multiple touch sensing electrodes. The touch panel judges whether a sensing area with the touch tool is present according to the downlink signal. When the sensing area is not present, the touch panel provides the first uplink signal to the touch sensing electrodes. When the sensing area is present, the touch panel provides the first uplink signal to the sensing area, and provides a second uplink signal to at least part of the touch sensing electrodes other than the sensing area. The first uplink signal is different from the second uplink signal.

Based on the above, the touch panel provides the first uplink signal to the first sensing area and provides the second uplink signal to the second sensing area. The touch tool generates the calculated uplink signal according to the first uplink signal and the second uplink signal, and provides the downlink signal according to the calculated uplink signal. In this way, the touch tool is not interfered by the second uplink signal and can maintain the analysis ability for the first uplink signal.

In order for the features and advantages of the disclosure to be more comprehensible, the following specific embodiments are described in detail in conjunction with the drawings.

DESCRIPTION OF THE EMBODIMENTS

Figure 1:
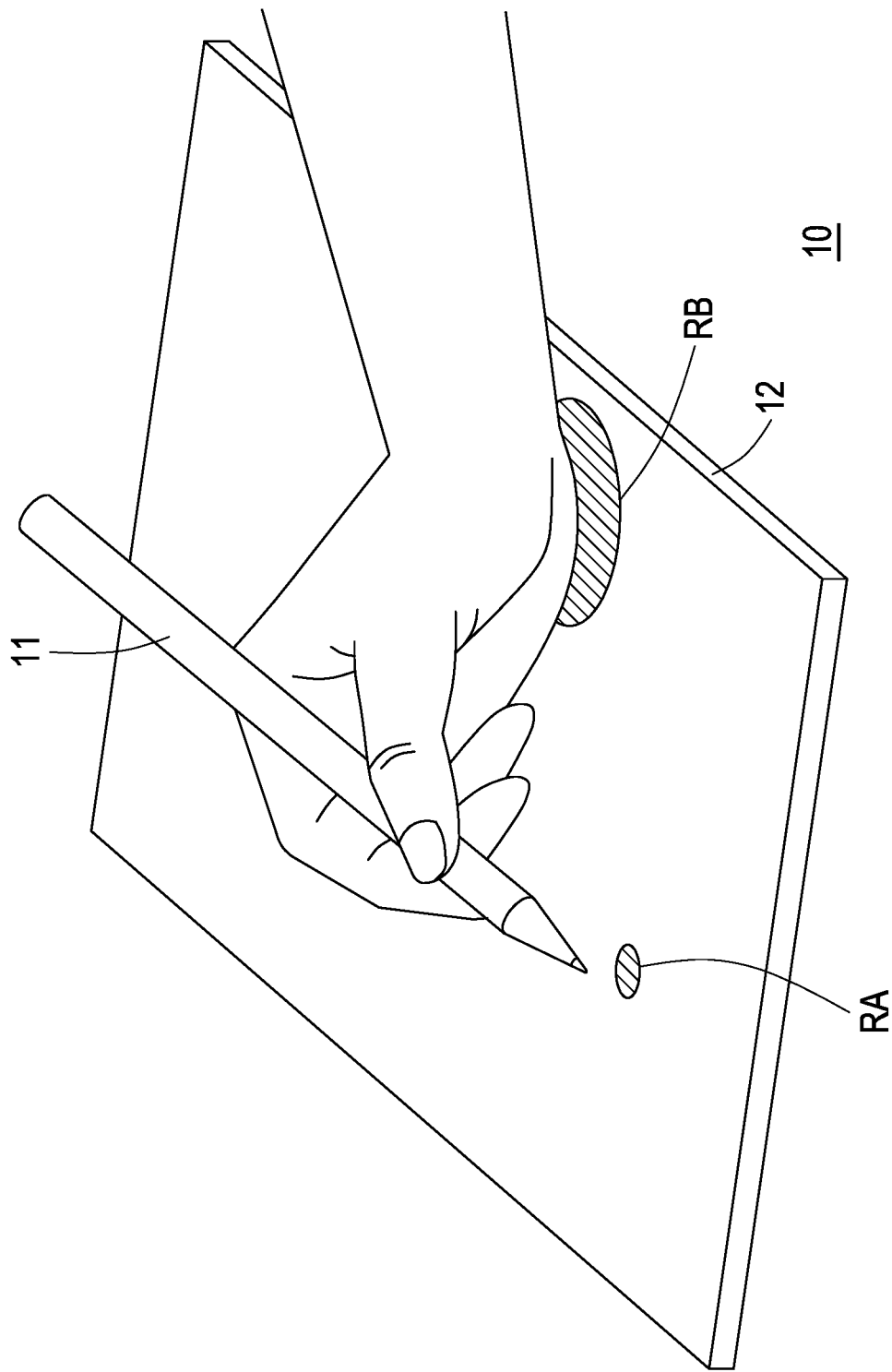
FIG. 1 is a schematic diagram of an operation of a conventional touch system.

Some embodiments of the disclosure will be described in detail with reference to the drawings. For the reference numerals cited in the following description, when the same reference numerals appear in different drawings, the reference numerals will be regarded as referring to the same or similar elements. The exemplary embodiments are only a part of the disclosure and do not disclose all possible implementations of the disclosure. More specifically, the exemplary embodiments are merely examples in the claims of the disclosure.

Figure 2:
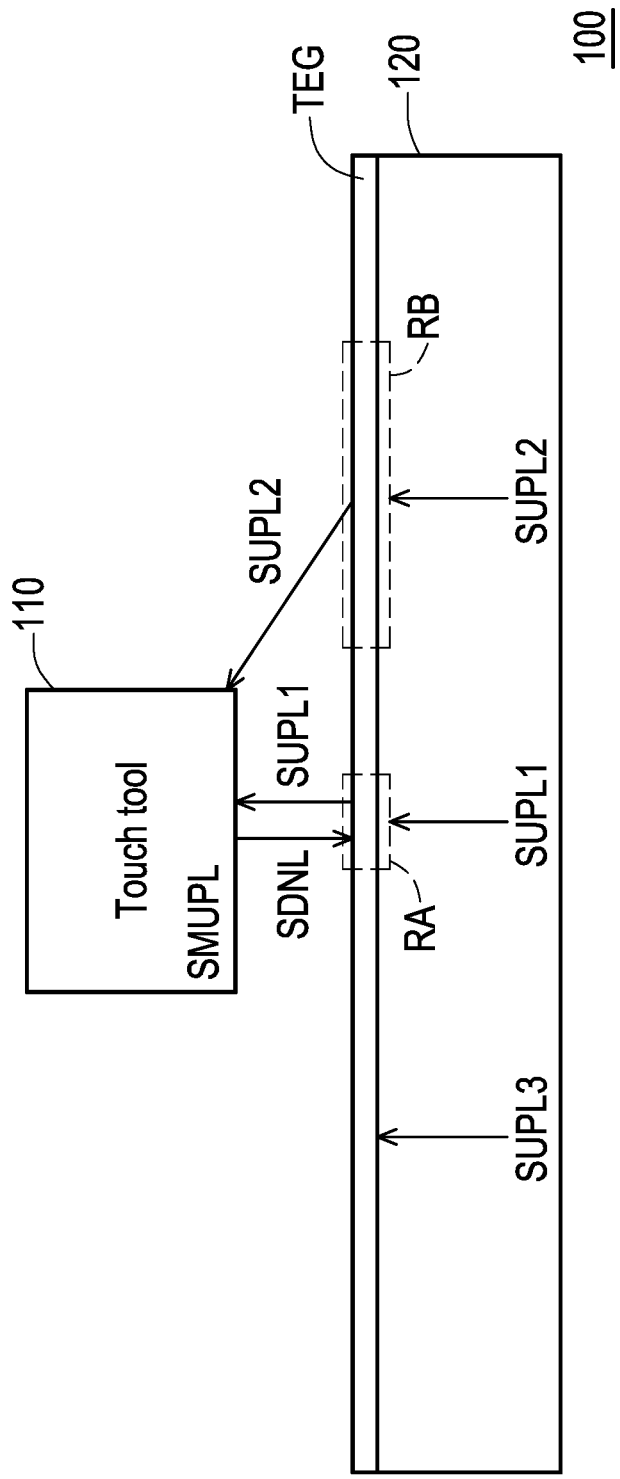
FIG. 2 is a schematic diagram of a touch system according to an embodiment of the disclosure.

Please refer to FIG. 2. FIG. 2 is a schematic diagram of a touch system according to an embodiment of the disclosure. In the embodiment, a touch system 100 includes a touch tool 110 and a touch panel 120. The touch tool 110 is, for example, a stylus (for example, an active capacitive stylus). A user holds the touch tool 110 to perform operations such as writing and drawing on the touch panel 120.

In the embodiment, the touch tool 110 provides a downlink signal SDNL. The touch panel 120 obtains a first sensing area RA sensed by the touch panel 120 itself and the touch tool 110 according to the downlink signal SDNL, and obtains a second sensing area RB other than the first sensing area RA. In the embodiment, the second sensing area RB is an area where touch sensing occurs between the touch panel 120 and other objects other than the touch tool 110. For example, the touch tool 110 includes a touch sensing electrode group TEG. The touch panel 120 obtains multiple sensing areas through touch sensing results of multiple touch sensing electrodes in the touch sensing electrode group TEG. The touch panel 120 judges a sensing area that receives the downlink signal SDNL among the sensing areas as the first sensing area RA, and judges a sensing area other than the first sensing area RA as the second sensing area RB. For example, the second sensing area RB is an area where the palm, finger, or wrist of the user and the touch panel 120 perform touch sensing. Therefore, the touch panel 120 can obtain the first sensing area RA and the second sensing area RB based on a position where the downlink signal SDNL is received.

In the embodiment, the touch panel 120 provides a first uplink signal SUPL1 to the first sensing area RA, and provides a second uplink signal SUPL2 to the second sensing area RB. The first uplink signal SUPL1 is different from the second uplink signal SUPL2.

The touch tool 110 receives the first uplink signal SUPL1 from the first sensing area RA. In addition, the touch tool 110 is inductively coupled to the second uplink signal SUPL2 from the second sensing area RB through the palm, finger, or wrist of the user. The touch tool 110 generates a calculated uplink signal SMUPL according to the first uplink signal SUPL1 and the second uplink signal SUPL2. The touch tool 110 provides the downlink signal SDNL according to the calculated uplink signal SMUPL.

It is worth mentioning here that the touch panel 120 provides the first uplink signal SUPL1 to the first sensing area and provides the second uplink signal SUPL2 to the second sensing area. The touch tool 110 generates the calculated uplink signal SMUPL according to the first uplink signal SUPL1 and the second uplink signal SUPL2 and provides the downlink signal SDNL according to the calculated uplink signal SMUPL. In this way, the touch tool 110 is not interfered by the second uplink signal SUPL2 and can maintain the analysis ability for the first uplink signal SUPL1.

Specifically, the first uplink signal SUPL1 is different from the second uplink signal SUPL2. The second uplink signal SUPL2 is used as a background signal. The touch tool 110 subtracts the second uplink signal SUPL2 from the first uplink signal SUPL1 to generate the calculated uplink signal SMUPL. In other words, the touch tool 110 analyzes the first uplink signal SUPL1 based on the second uplink signal SUPL2 to generate the calculated uplink signal SMUPL.

In addition, in some embodiments, the touch panel 120 also provides a third uplink signal SUPL3 to other areas other than the first sensing area RA and the second sensing area RB.

In the embodiment, the touch panel 120 sequentially provides the first uplink signal SUPL1 to at least one touch sensing electrode corresponding to the first sensing area RA in a row-by-row or column-by-column manner. The area of the second sensing area RB is greater than the area of the first sensing area RA. Therefore, the touch panel 120 sequentially provides the second uplink signal SUPL2 to at least one touch sensing electrode corresponding to the second sensing area RB in an alternate-column or alternate-row manner. For example, the touch panel 120 sequentially provides the second uplink signal SUPL2 to the touch sensing electrodes in odd-numbered columns or the touch sensing electrodes in odd-numbered rows corresponding to the second sensing area RB (the disclosure is not limited thereto). In other words, the second sensing area RB may have a lower uplink signal supply density.

Figure 3:
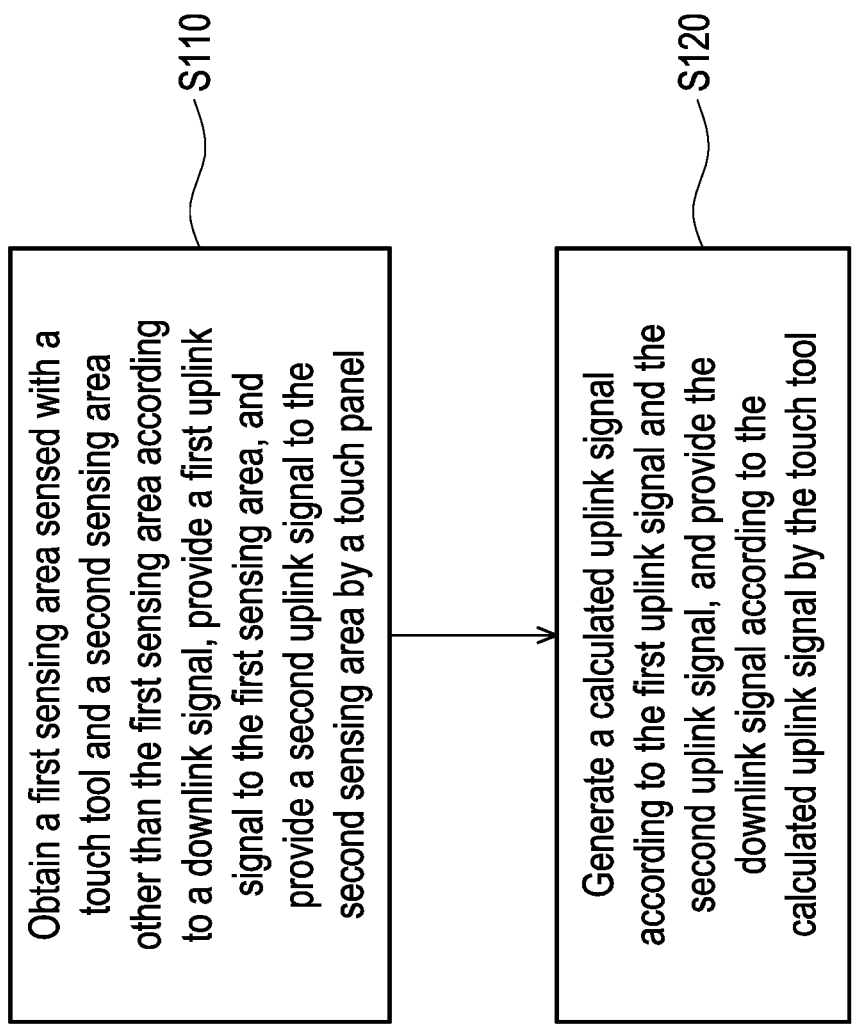
FIG. 3 is a flowchart of an operation method according to an embodiment of the disclosure.

Please refer to FIG. 2 and FIG. 3 at the same time. FIG. 3 is a flowchart of an operation method according to an embodiment of the disclosure. In the embodiment, the operation method is applicable to the touch system 100. The operation method includes Steps S110 and S120. In Step S110, the touch panel 120 obtains the first sensing area RA contacting the touch tool 110 and the second sensing area RB other than the first sensing area RA according to the downlink signal SDNL, provides the first uplink signal SUPL1 to the first sensing area RA, and provides the second uplink signal SUPL2 to the second sensing area RB. In Step S120, the touch tool 110 generates the calculated uplink signal SMUPL according to the first uplink signal SUPL1 and the second uplink signal SUPL2, and provides the downlink signal SDNL according to the calculated uplink signal SMUPL. The implementation details of Steps S110 and S120 have been clearly described in the embodiment of FIG. 2, so there will be no repetition.

Figure 4:
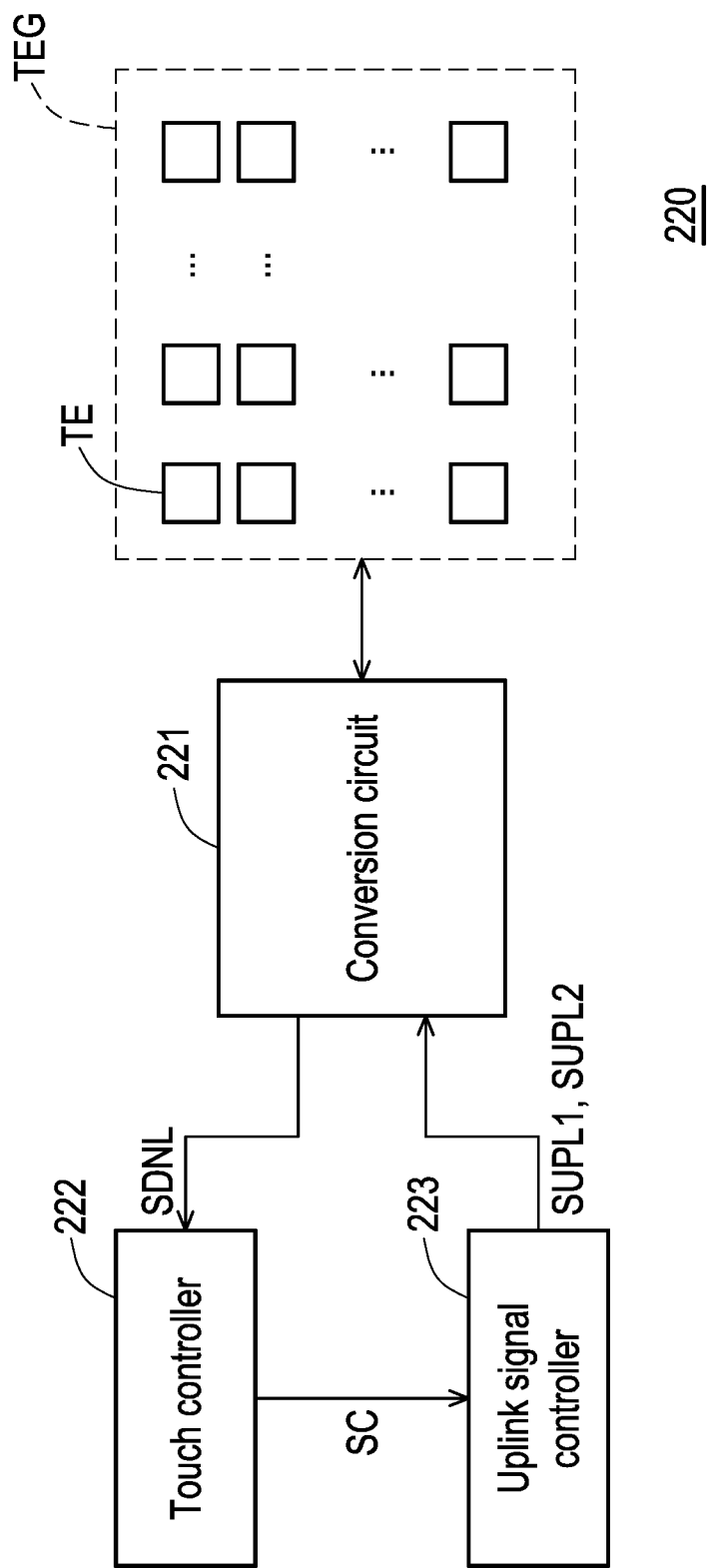
FIG. 4 is a schematic diagram of a touch panel according to an embodiment of the disclosure.

Please refer to FIG. 2 and FIG. 4 at the same time. FIG. 4 is a schematic diagram of a touch panel according to an embodiment of the disclosure. In the embodiment, a touch panel 220 includes multiple touch sensing electrodes TE, a conversion circuit 221, a touch controller 222, and an uplink signal controller 223. The touch sensing electrodes TE form the touch sensing electrode group TEG. The conversion circuit 221 is connected to the touch sensing electrodes TE. The touch controller 222 is connected to the conversion circuit 221. The touch controller 222 receives the downlink signal SDNL through the touch sensing electrodes TE and the conversion circuit 221 during a downlink period, and obtains the first sensing area RA and the second sensing area RB according to the downlink signal SDNL. Further, the conversion circuit 221 can obtain at least one sensing area of the touch panel 220. The conversion circuit 221 judges the sensing area with the downlink signal SDNL as the first sensing area RA, and judges the sensing area without the downlink signal SDNL as the second sensing area RB. The conversion circuit 221 can determine a sensing position of the touch tool 110 (that is, the first sensing area RA). The conversion circuit 221 judges the other sensing area as the second sensing area RB.

In the embodiment, the uplink signal controller 223 is connected to the conversion circuit 221. The uplink signal controller 223 generates at least one of the first uplink signal SUPL1 and the second uplink signal SUPL2 during an uplink period.

During the uplink period, the uplink signal controller 223, for example, provides at least one of the first uplink signal SUPL1 and the second uplink signal SUPL2 in response to a control signal SC provided by the touch controller 222.

For example, when the touch controller 222 determines that neither the first sensing area RA nor the second sensing area RB is present, the touch controller 222 controls the touch controller 222 to provide the first uplink signal SUPL1 during the uplink period. The touch controller 222 also controls the conversion circuit 221 to provide the first uplink signal SUPL1 to all the touch sensing electrodes TE during the uplink period.

For example, when the touch controller 222 determines that the first sensing area RA is present and the second sensing area RB is not present, the touch controller 222 controls the touch controller 222 to provide the first uplink signal SUPL1 during the uplink period. The touch controller 222 also controls the conversion circuit 221 to provide the first uplink signal SUPL1 to at least one touch sensing electrode TE corresponding to the first sensing area RA during the uplink period.

For example, when the touch controller 222 determines that the second sensing area RB is present and the first sensing area RA is not present, the touch controller 222 controls the touch controller 222 to provide the second uplink signal SUPL2 during the uplink period. The touch controller 222 also controls the conversion circuit 221 to provide the second uplink signal SUPL2 to at least one touch sensing electrode TE corresponding to the second sensing area RB during the uplink period.

For another example, when the touch controller 222 determines that the first sensing area RA and the second sensing area RB are both present, the touch controller 222 controls the touch controller 222 to provide the first uplink signal SUPL1 and the second uplink signal SUPL2 during the uplink period. The touch controller 222 also controls the conversion circuit 221 to provide the first uplink signal SUPL1 to at least one touch sensing electrode TE corresponding to the first sensing area RA, and provide the second uplink signal SUPL2 to at least one touch sensing electrode TE corresponding to the second sensing area RB during the uplink period.

In the embodiment, the conversion circuit 221 alternately performs the above operations based on the downlink period and the uplink period. The conversion circuit 221 may be a channel conversion circuit.

Figure 5:
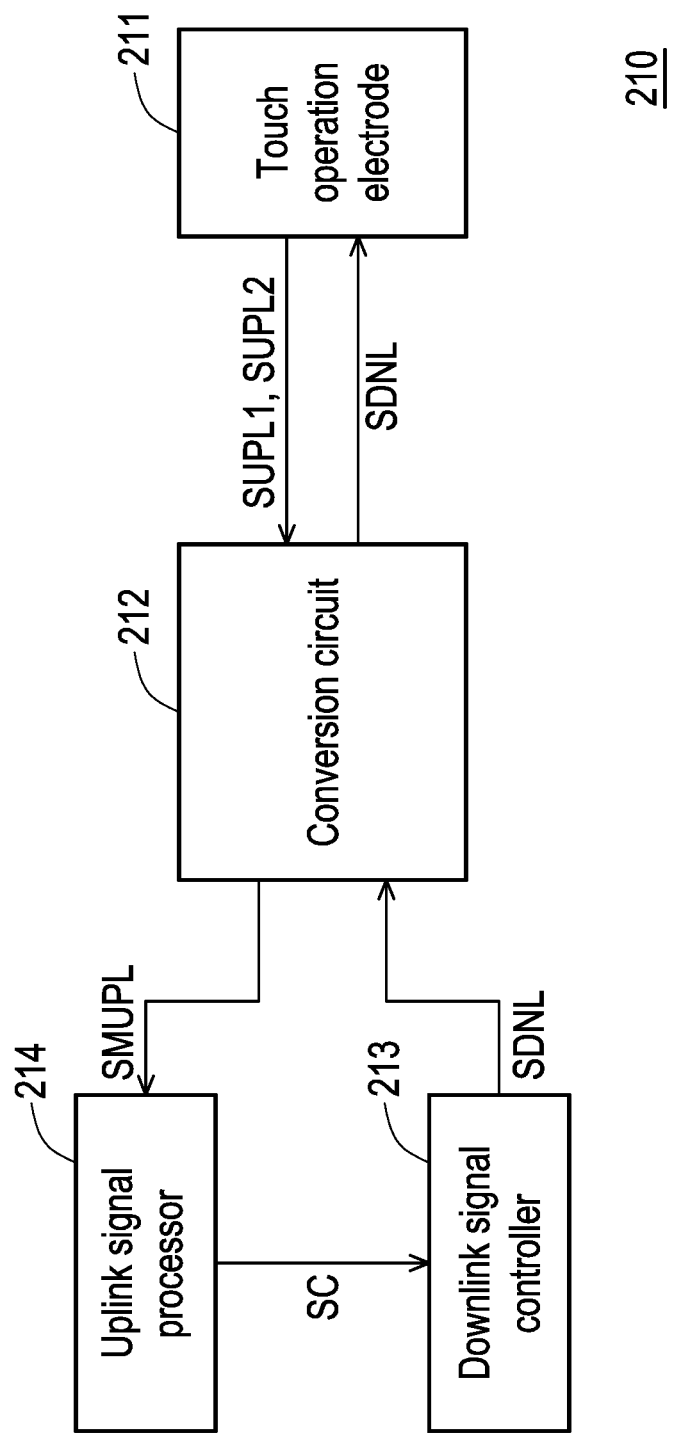
FIG. 5 is a schematic diagram of a touch tool according to an embodiment of the disclosure.

Please refer to FIG. 2 and FIG. 5 at the same time. FIG. 5 is a schematic diagram of a touch tool according to an embodiment of the disclosure. In the embodiment, a touch tool 210 includes a touch operation electrode 211, a conversion circuit 212, and a downlink signal controller 213. The conversion circuit 212 is connected to the touch operation electrode 211. The downlink signal controller 213 is connected to the conversion circuit 212. The downlink signal controller 213 generates the downlink signal SDNL during the downlink period, and provides the downlink signal SDNL to the touch operation electrode 211 through the conversion circuit 212. The conversion circuit 212 receives the first uplink signal SUPL1 through the touch operation electrode 211 and receives the second uplink signal SUPL2 through a coupling manner during the uplink period. The conversion circuit 212 generates the calculated uplink signal SMUPL according to the first uplink signal SUPL1 and the second uplink signal SUPL2.

In the embodiment, the touch tool 210 further includes an uplink signal processor 214. The uplink signal processor 214 is connected to the conversion circuit 212 and the downlink signal controller 213. The uplink signal processor 214 controls the downlink signal controller 213 to generate the downlink signal SDNL according to the calculated uplink signal SMUPL.

In the embodiment, the conversion circuit 212 alternately performs the above operations based on the downlink period and the uplink period. The conversion circuit 212 may be a channel conversion circuit.

Figure 6:
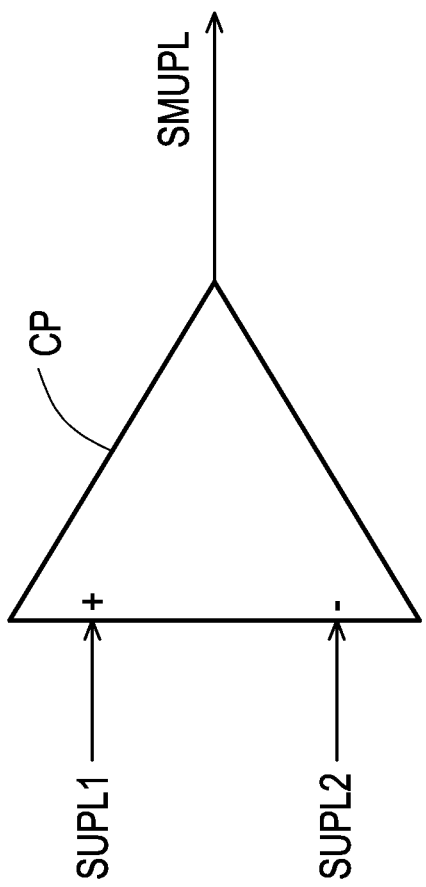
FIG. 6 is a schematic diagram of a comparator according to an embodiment of the disclosure.

Please refer to FIG. 5 and FIG. 6 at the same time. FIG. 6 is a schematic diagram of a comparator of a touch tool according to an embodiment of the disclosure. In the embodiment, the conversion circuit 212 includes a comparator CP. A non-inverting input terminal of the comparator CP receives the first uplink signal SUPL1 through the touch operation electrode 211. An inverting input terminal of the comparator CP receives the second uplink signal SUPL2. The inverting input terminal of the comparator CP is, for example, connected to a casing of a touch tool (that is, the touch tool 210 shown in FIG. 4). An output terminal of the comparator CP is used to output the calculated uplink signal SMUPL. In the embodiment, the comparator CP subtracts the second uplink signal SUPL2 from the first uplink signal SUPL1 to generate the calculated uplink signal SMUPL.

Next, multiple embodiments are used to illustrate the implementation examples of a first uplink signal, a second uplink signal, and a calculated uplink signal.

Figure 7:
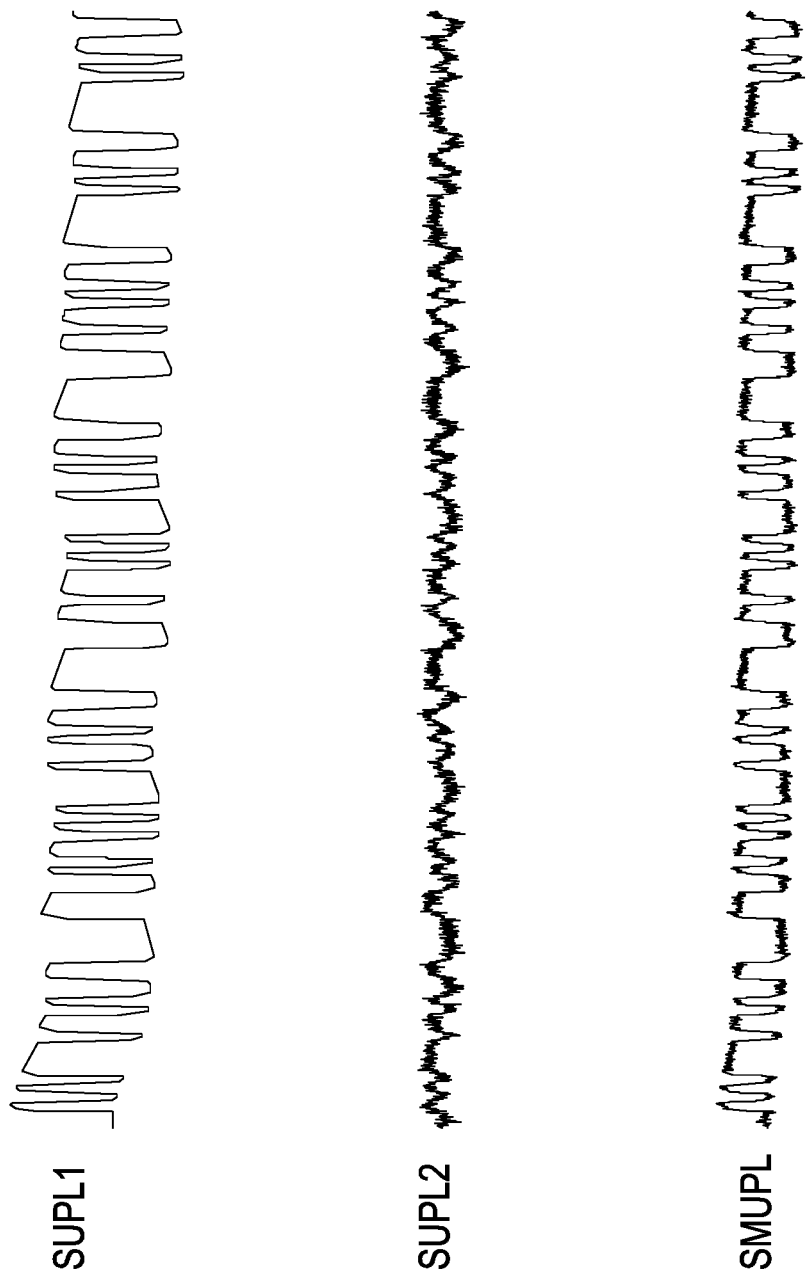
FIG. 7 is a waveform diagram of a first uplink signal, a second uplink signal, and a calculated uplink signal according to a first embodiment of the disclosure.

Please refer to FIG. 6 and FIG. 7 at the same time. FIG. 7 is a waveform diagram of a first uplink signal, a second uplink signal, and a calculated uplink signal according to a first embodiment of the disclosure. FIG. 7 shows a waveform of the first uplink signal SUPL1 and a waveform of the second uplink signal SUPL2 received by the comparator CP and a waveform of the calculated uplink signal SMUPL provided by the comparator CP when the first sensing area and the second sensing area are both present. When the first sensing area and the second sensing area are both present, the touch panel provides the first uplink signal SUPL1 to the first sensing area, and provides the second uplink signal SUPL2 to the second sensing area. In the embodiment, the amplitude of the second uplink signal SUPL2 is smaller than the amplitude of the first uplink signal SUPL1. Furthermore, the first uplink signal SUPL1 has a preset waveform and amplitude. The phase of the second uplink signal SUPL2 follows the phase of the first uplink signal SUPL1. However, the amplitude of the second uplink signal SUPL2 is significantly smaller than the amplitude of the first uplink signal SUPL1. Therefore, the phase of the calculated uplink signal SMUPL output by the comparator CP also follows the phase of the first uplink signal SUPL1.

Figure 8:
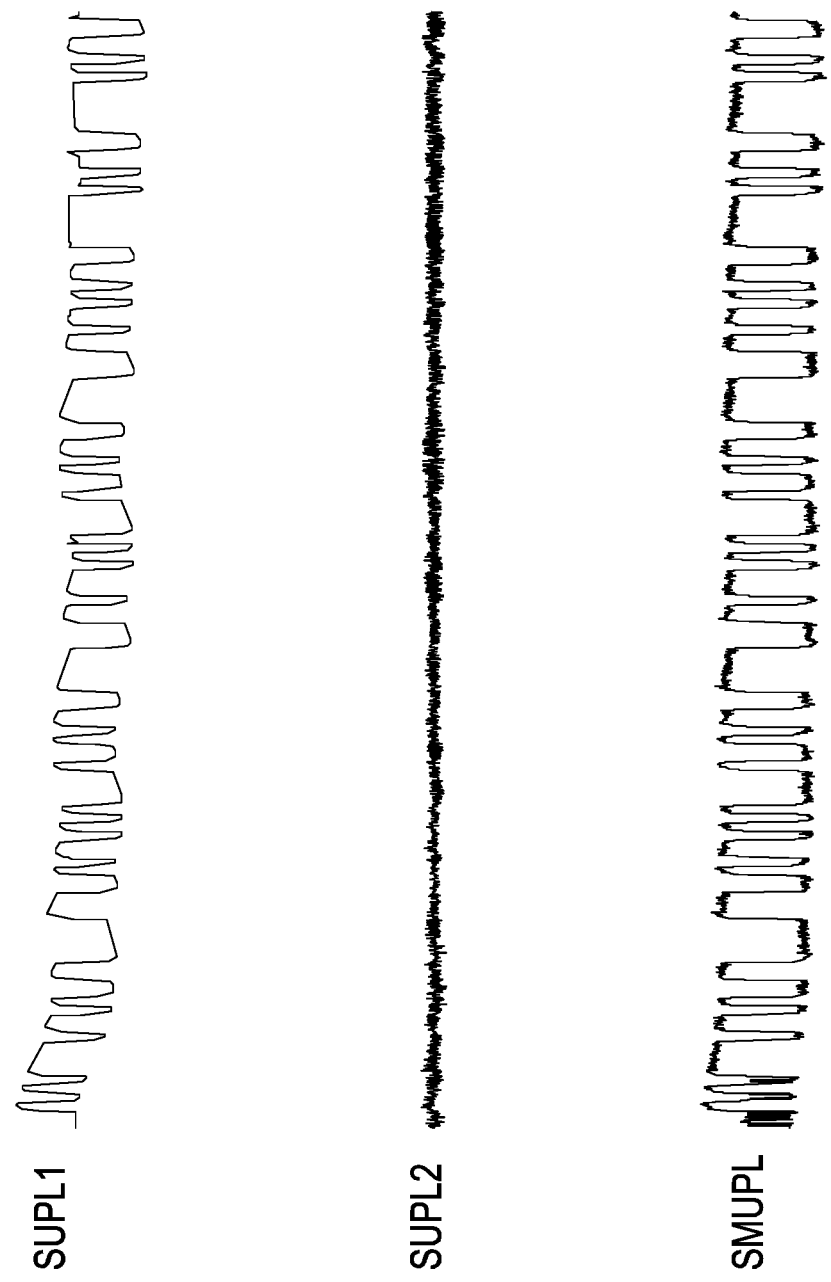
FIG. 8 is a waveform diagram of a first uplink signal, a second uplink signal, and a calculated uplink signal according to a second embodiment of the disclosure.

Please refer to FIG. 6 and FIG. 8 at the same time. FIG. 8 is a waveform diagram of a first uplink signal, a second uplink signal, and a calculated uplink signal according to a second embodiment of the disclosure. FIG. 8 shows a waveform of the first uplink signal SUPL1 and a waveform of the second uplink signal SUPL2 received by the comparator CP and a waveform of the calculated uplink signal SMUPL provided by the comparator CP when the first sensing area and the second sensing area are both present. In the embodiment, the amplitude of the second uplink signal SUPL2 is significantly smaller than the amplitude of the first uplink signal SUPL1. The second uplink signal SUPL2 is, for example, a ground signal or a reference low voltage signal. Therefore, the phase of the calculated uplink signal SMUPL output by the comparator CP also follows the phase of the first uplink signal SUPL1.

Figure 9:
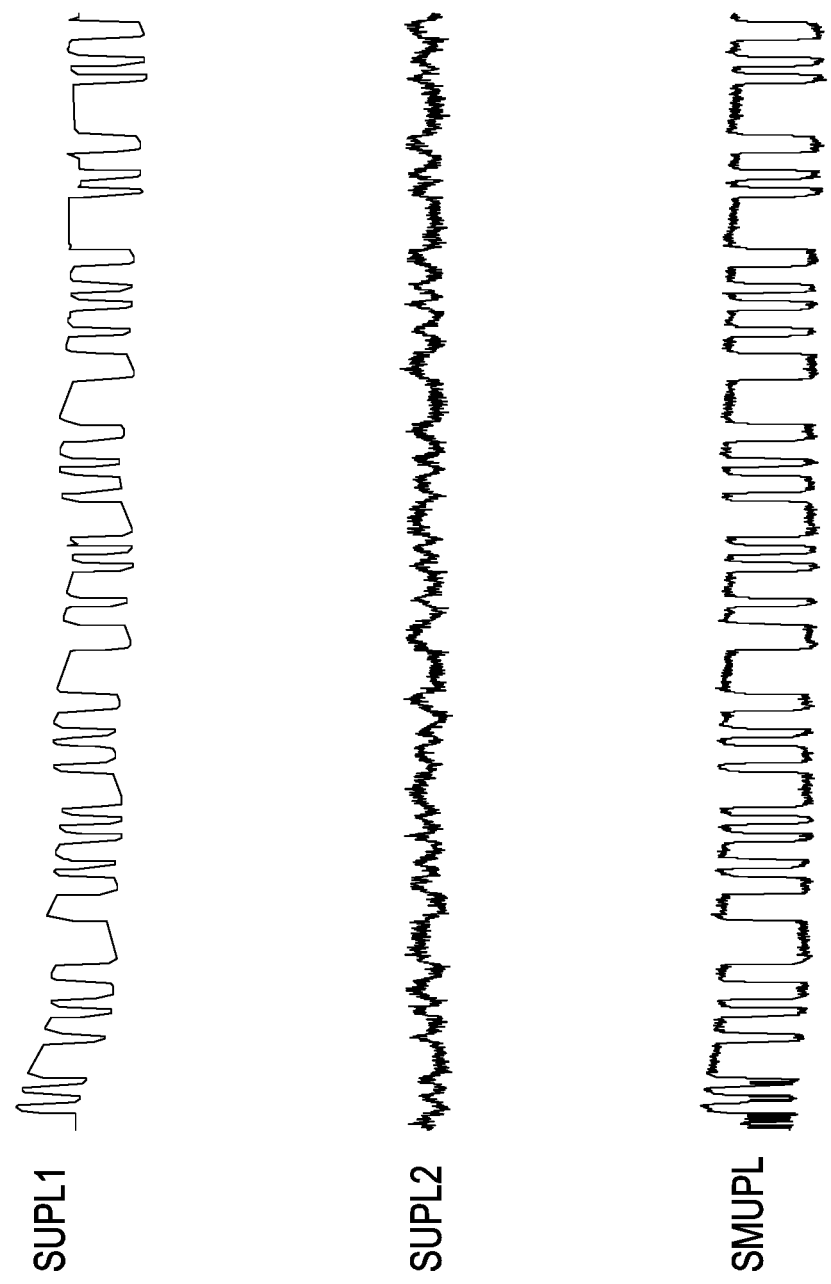
FIG. 9 is a waveform diagram of a first uplink signal, a second uplink signal, and a calculated uplink signal according to a third embodiment of the disclosure.

Please refer to FIG. 6 and FIG. 9 at the same time. FIG. 9 is a waveform diagram of a first uplink signal, a second uplink signal, and a calculated uplink signal according to a third embodiment of the disclosure. FIG. 9 shows a waveform of the first uplink signal SUPL1 and a waveform of the second uplink signal SUPL2 received by the comparator CP and a waveform of the calculated uplink signal SMUPL provided by the comparator CP when the first sensing area and the second sensing area are both present. In the embodiment, the amplitude of the second uplink signal SUPL2 is smaller than the amplitude of the first uplink signal SUPL1. In addition, the phase of the second uplink signal SUPL2 is opposite to the phase of the first uplink signal SUPL1. Therefore, the phase of the calculated uplink signal SMUPL output by the comparator CP also follows the phase of the first uplink signal SUPL1. In addition, the amplitude of the calculated uplink signal SMUPL is greater than the amplitude of the first uplink signal SUPL1. Therefore, the identification ability of the touch tool for the uplink signal can be enhanced.

Figure 10:
FIG. 10 is a waveform diagram of a second uplink signal and a calculated uplink signal according to a fourth embodiment of the disclosure.

Please refer to FIG. 6 and FIG. 10 at the same time. FIG. 10 is a waveform diagram of a second uplink signal and a calculated uplink signal according to a fourth embodiment of the disclosure. FIG. 10 shows a waveform of the second uplink signal SUPL2 received by the comparator CP and a waveform of the calculated uplink signal SMUPL provided by the comparator CP when only the second sensing area is present. The touch panel provides the second uplink signal SUPL2 to the second sensing area and stops providing the first uplink signal SUPL1. In the embodiment, the first sensing area is not present, which means that the touch tool does not contact or approach the touch panel. Therefore, the touch operation electrode of the touch tool does not receive the first uplink signal SUPL1. The touch tool enables the non-inverting input terminal of the comparator CP or the touch operation electrode to receive a direct current voltage signal VG with a fixed voltage value (for example, 0 volts, the disclosure is not limited thereto).

In the embodiment, the phase of the second uplink signal SUPL2 is opposite to the phase of the original first uplink signal SUPL1. Therefore, when only the second sensing area is present, the phase of the calculated uplink signal SMUPL is still equal to the phase of the original first uplink signal SUPL1.

It is worth mentioning that in the fourth embodiment of the disclosure, in the case where the touch tool does not contact or approach the touch panel, the touch tool may receive the second uplink signal SUPL2 through a coupling manner to obtain the calculated uplink signal SMUPL. Therefore, in the case where the touch tool does not contact or approach the touch panel, the touch tool can use the calculated uplink signal SMUPL to perform synchronous settings with the touch panel. For example, when there is a pen lifting distance (0.5 centimeters to tens of centimeters) between the touch tool and the touch panel, the touch tool may still be coupled to the second uplink signal SUPL2 through the hand of the user to obtain the calculated uplink signal SMUPL. The touch tool uses the calculated uplink signal SMUPL to perform the synchronous settings with the touch panel.

Figure 11:
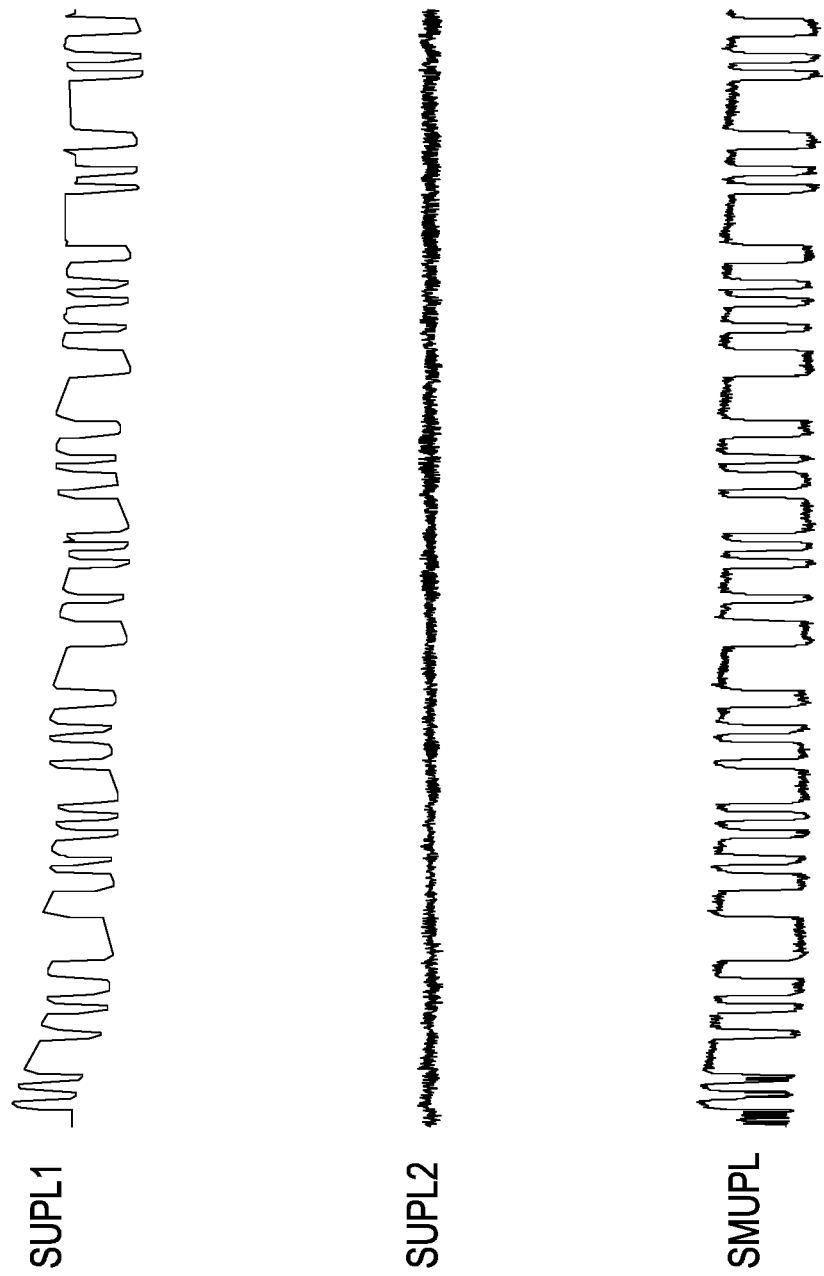
FIG. 11 is a waveform diagram of a first uplink signal, a second uplink signal, and a calculated uplink signal according to a fifth embodiment of the disclosure.

Please refer to FIG. 6 and FIG. 11 at the same time. FIG. 11 is a waveform diagram of a first uplink signal, a second uplink signal, and a calculated uplink signal according to a fifth embodiment of the disclosure. FIG. 11 shows a waveform of the first uplink signal SUPL1 and a waveform of the second uplink signal SUPL2 received by the comparator CP and a waveform of the calculated uplink signal SMUPL provided by the comparator CP when only the first sensing area is present. In the embodiment, the second sensing area is not present. The touch panel provides the first uplink signal SUPL1 to the first sensing area and stops providing the second uplink signal SUPL2. Therefore, the second uplink signal SUPL2 received by the comparator CP may be noise instead of the uplink signal provided by the touch panel. Therefore, the phase of the calculated uplink signal SMUPL output by the comparator CP also follows the phase of the first uplink signal SUPL1.

Figure 12:
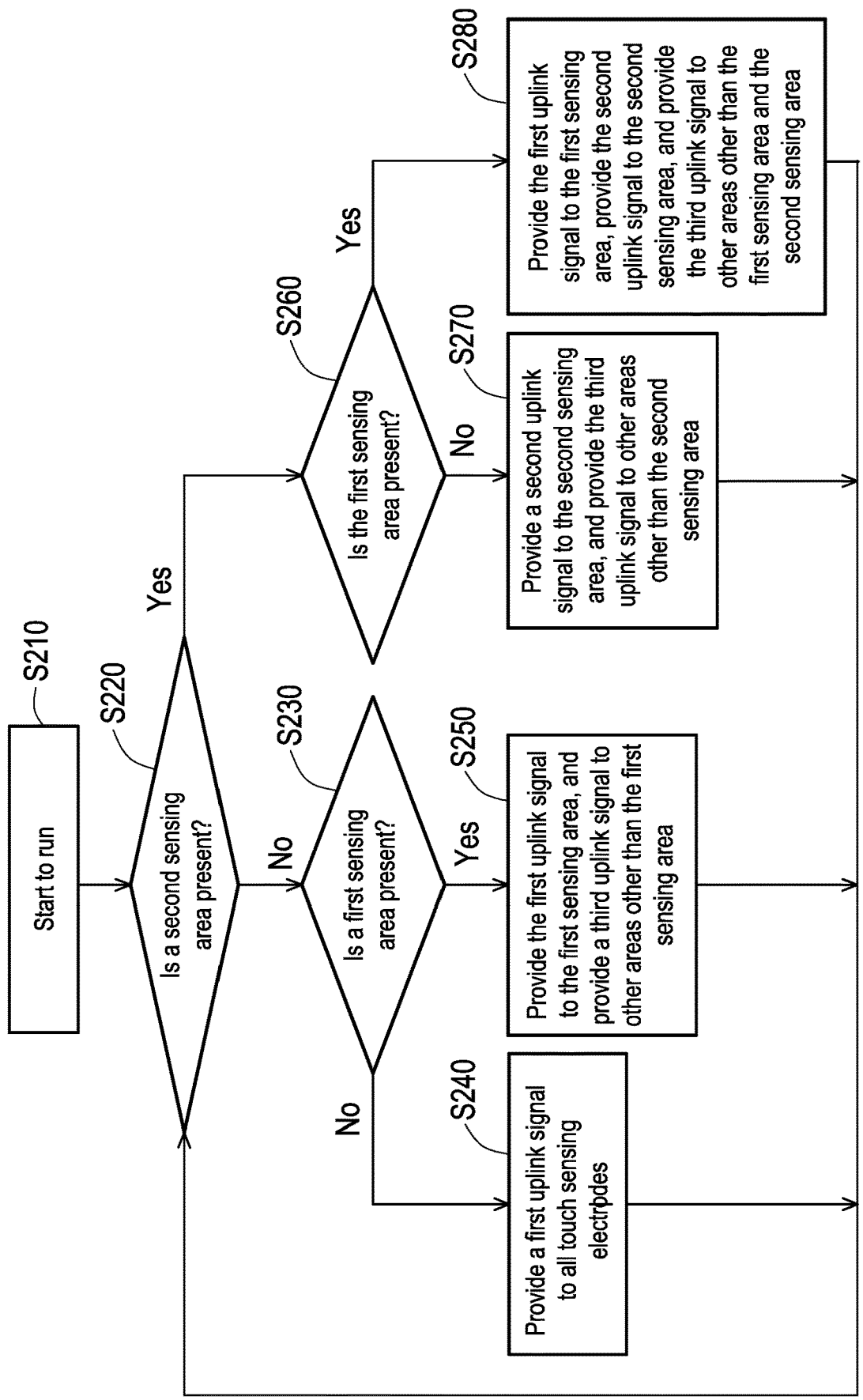
FIG. 12 is a flowchart of an operation of a touch panel according to an embodiment of the disclosure.

Please refer to FIG. 2 and FIG. 12 at the same time. FIG. 12 is a flowchart of an operation of a touch panel according to an embodiment of the disclosure. In the embodiment, the operation flow shown in FIG. 12 is applicable to the touch panel 120. In Step S210, the touch panel 120 starts to run. In Step S220, the touch panel 120 judges whether the second sensing area RB is present. When it is judged that the second sensing area RB is not present, the touch panel 120 judges whether the first sensing area RA is present in Step S230. When it is judged that the second sensing area RB is present, the touch panel 120 judges whether the first sensing area RA is present in Step S260. In Steps S220, S230, and S260, the touch panel 120 can obtain whether at least one sensing area is present. Further, the touch panel 120 obtains the first sensing area RA sensed by the touch panel 120 itself and the touch tool 110 and the second sensing area RB other than the first sensing area RA according to the downlink signal SDNL. The second sensing area RB is the area where the palm, finger, or wrist of the user and the touch panel 120 perform touch sensing. Therefore, the touch panel 120 can obtain the first sensing area RA and the second sensing area RB based on the position where the downlink signal SDNL is received.

In Step S230, when it is judged that the first sensing area RA is not present, the touch panel 120 provides the first uplink signal SUPL1 to all the touch sensing electrodes of the touch panel 120 in Step S240. In other words, based on the judgement of Steps S220 and S230, when neither the first sensing area RA nor the second sensing area RB is present, the touch panel 120 provides the first uplink signal SUPL1 to all the touch sensing electrodes.

On the other hand, in Step S230, when it is judged that the first sensing area RA is present, the touch panel 120 provides the first uplink signal SUPL1 to the first sensing area RA, and provides the third uplink signal SUPL3 to the other areas other than the first sensing area RA in Step S250. In other words, based on the judgment of Steps S220 and S230, when the touch panel obtains the position of the first sensing area RA and obtains that the second sensing area RB is not present, the touch panel 120 provides the first uplink signal SUPL1 to the first sensing area RA, and provides the third uplink signal SUPL3 to the other areas other than the first sensing area RA. In the embodiment, the waveform of the first uplink signal SUPL1 is shown in FIG. 11. A waveform of the third uplink signal SUPL3 may be implemented by the waveform of the second uplink signal SUPL2 shown in FIG. 8 and FIG. 9. Specifically, the amplitude of the third uplink signal SUPL3 is smaller than the amplitude of the first uplink signal SUPL1. In an embodiment, the phase of the third uplink signal SUPL3 is opposite to the phase of the first uplink signal SUPL1. In an embodiment, the third uplink signal SUPL3 is, for example, a ground signal or a reference low voltage signal.

In Step S260, when it is judged that the first sensing area RA is not present, the touch panel 120 provides the second uplink signal SUPL2 to the second sensing area RB, and provides the third uplink signal SUPL3 to other areas other than the second sensing area RB in Step S270. In other words, based on the judgment of Steps S220 and S260, when the position of the second sensing area RB is obtained and that the first sensing area RA is not present is obtained, the touch panel 120 provides the second uplink signal SUPL2 to the second sensing area RB, and provides the third uplink signal SUPL3 to the other areas other than the second sensing area RB.

In an embodiment, the phase of the second uplink signal SUPL2 in Step S270 is opposite to the phase of the original first uplink signal SUPL1. Further, the second uplink signal SUPL2 may be implemented by the second uplink signal SUPL2 shown in FIG. 10. The touch tool 110 obtains the calculated uplink signal SMUPL according to the second uplink signal SUPL2. Therefore, the phase of the calculated uplink signal SMUPL is still equal to the phase of the original first uplink signal SUPL1. The phase of the third uplink signal SUPL3 in Step S270 is the same as the phase of the original first uplink signal SUPL1. In an embodiment, in Step S270, the amplitude of the third uplink signal SUPL3 is smaller than the amplitude of the second uplink signal SUPL2. In an embodiment, the third uplink signal SUPL3 in Step S270 is, for example, a ground signal or a reference low voltage signal.

In Step S260, when it is judged that the first sensing area RA is present, the touch panel 120 provides the first uplink signal SUPL1 to the first sensing area RA, provides the second uplink signal SUPL2 to the second sensing area RB, and provides the third uplink signal SUPL3 to the other areas other than the first sensing area RA and the second sensing area RB in Step S280. In other words, based on the judgment of Steps S220 and S260, when the position of the first sensing area RA and the position of the second sensing area RB are obtained, the touch panel 120 provides the first uplink signal SUPL1 to the first sensing area RA, provides the second uplink signal SUPL2 to the second sensing area RB, and provides the third uplink signal SUPL3 to the other areas other than the first sensing area RA and the second sensing area RB.

In an embodiment, the amplitude of the second uplink signal SUPL2 in Step S280 is smaller than the amplitude of the first uplink signal SUPL1 (shown in FIG. 7 and FIG. 8). In an embodiment, the phase of the second uplink signal SUPL2 in Step S280 is opposite to the phase of the first uplink signal SUPL1 (shown in FIG. 9).

In addition, in an embodiment, the amplitude of the third uplink signal SUPL3 in Step S280 is smaller than the amplitude of the first uplink signal SUPL1. In an embodiment, the phase of the third uplink signal SUPL3 in Step S280 is opposite to the phase of the first uplink signal SUPL1.

Figure 13:
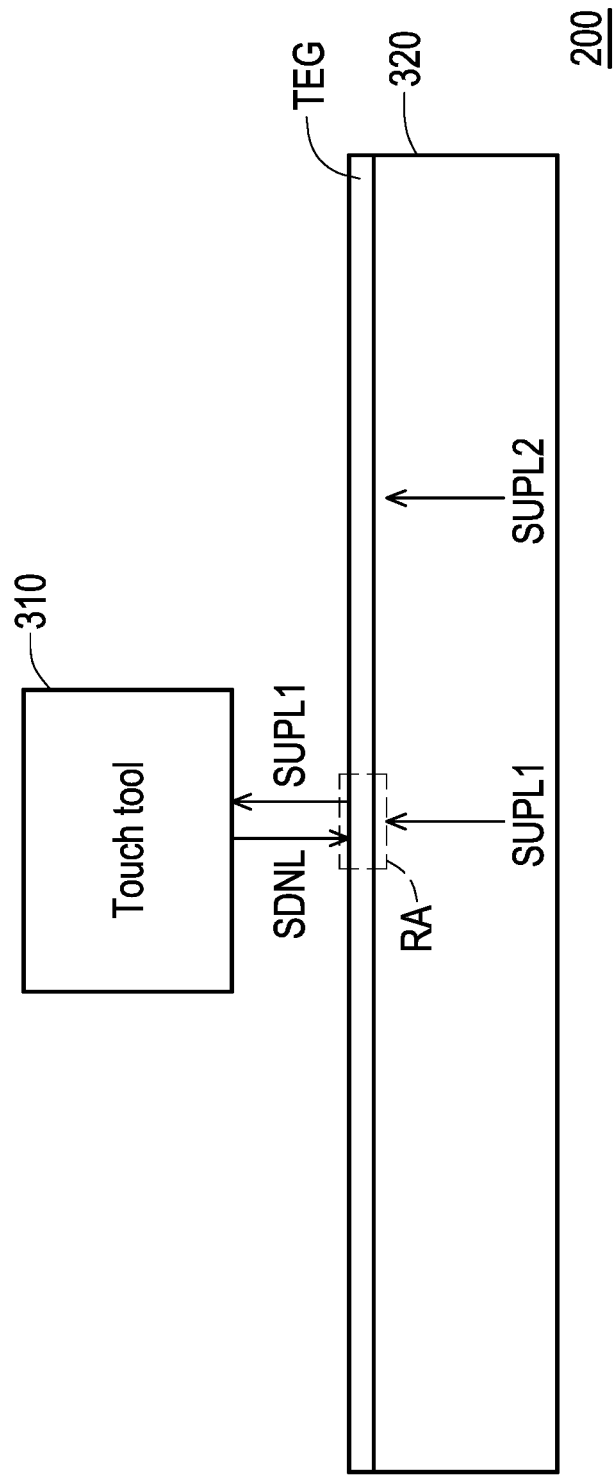
FIG. 13 is a schematic diagram of a touch system according to an embodiment of the disclosure.

Please refer to FIG. 13. FIG. 13 is a schematic diagram of a touch system according to an embodiment of the disclosure. In the embodiment, a touch system 200 includes a touch tool 310 and a touch panel 320. The user holds the touch tool 310 to perform operations such as writing and drawing on the touch panel 320.

The touch tool 310 provides the downlink signal SDPL according to the first uplink signal SUPL1. The touch panel 320 includes the touch sensing electrode group TEG formed by the touch sensing electrodes. The touch panel 320 judges whether the sensing area RA sensed by the touch panel 320 and the touch tool 310 is present according to the downlink signal SDPL. When the sensing area RA is not present, the touch panel 320 uses the first uplink signal SUPL1 to scan the touch sensing electrodes of the touch sensing electrode group TEG. On the other hand, when the sensing area RA is present, the touch panel 320 provides the first uplink signal SUPL1 to the sensing area RA, and provides the second uplink signal SUPL2 to at least part of the touch sensing electrodes other than the sensing area RA. In the embodiment, the first uplink signal SUPL1 is different from the second uplink signal SUPL2.

In the embodiment, the "other areas" include non-sensing areas and other sensing areas other than the sensing area RA.

In the embodiment, the touch panel 320 judges whether the sensing area RA is present according to a receiving result of the downlink signal SDPL. Further, when the touch panel 320 does not receive the downlink signal SDPL through the touch sensing electrode group TEG, the touch panel 320 judges that the sensing area RA is not present. Therefore, the touch panel 320 generates the first uplink signal SUPL1 and provides the first uplink signal SUPL1 to the touch sensing electrode group TEG.

On the other hand, when the touch panel 320 receives the downlink signal SDPL through the touch sensing electrode group TEG, the touch panel 320 judges that the sensing area RA is present, and obtains the position of the sensing area RA (that is, the position of the touch tool 310). The touch panel 320 judges an area of at least one touch sensing electrode receiving the downlink signal SDPL as the sensing area RA. Therefore, the touch panel 320 generates the first uplink signal SUPL1 and the second uplink signal SUPL2. The touch panel 320 provides the first uplink signal SUPL1 to the touch sensing electrode corresponding to the sensing area RA, and provides the second uplink signal SUPL2 to other areas other than the sensing area RA.

In the embodiment, once the position of the sensing area RA is judged, the touch panel 320 follows the position of the sensing area RA to provide the first uplink signal SUPL1.

Figure 14:
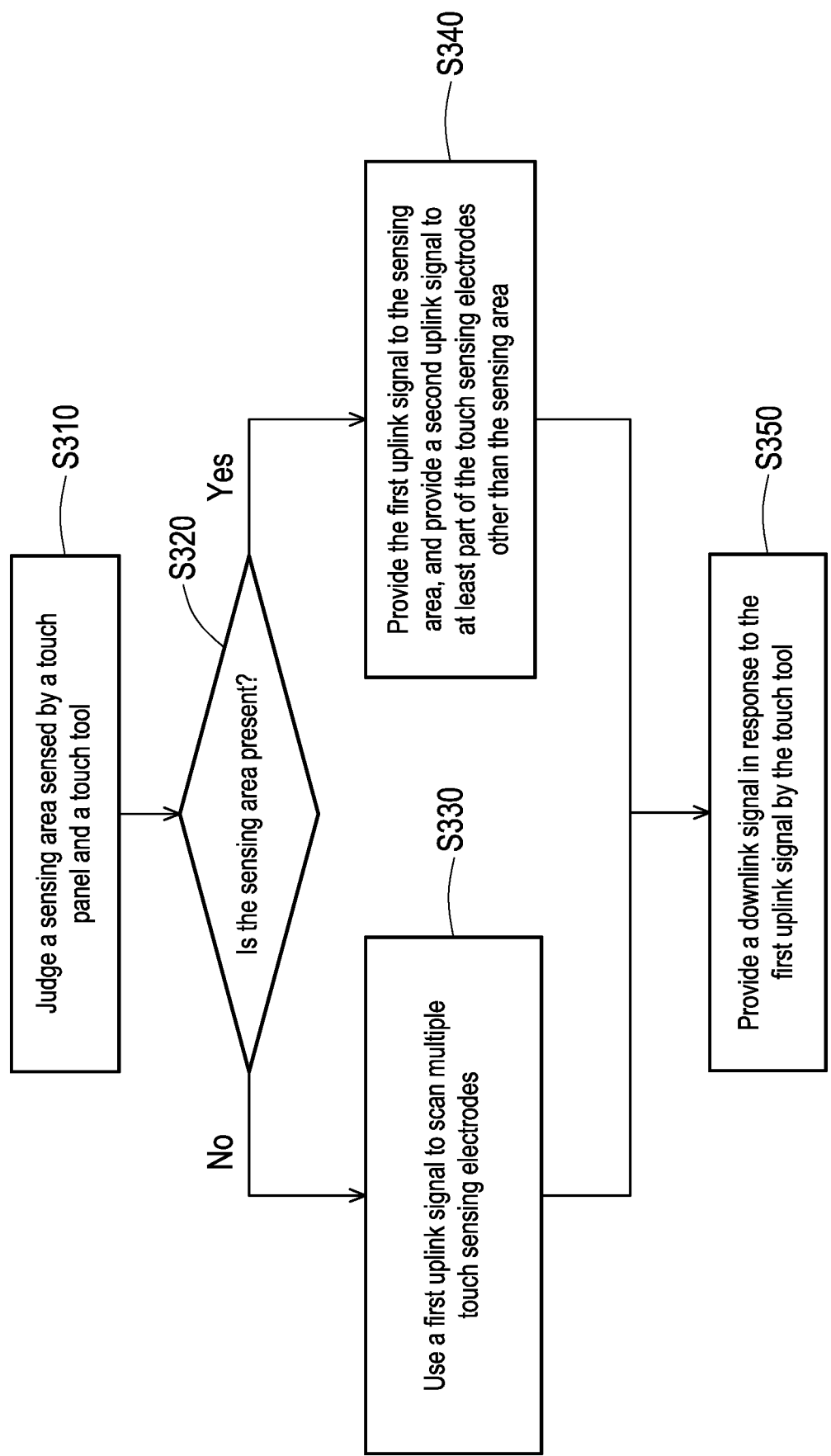
FIG. 14 is a flowchart of an operation method according to an embodiment of the disclosure.

Please refer to FIG. 13 and FIG. 14 at the same time. FIG. 14 is a flowchart of an operation method according to an embodiment of the disclosure. The operation method is applicable to the touch system 100. In the embodiment, in Step S310, the touch panel 320 judges the sensing area RA sensed by the touch panel 320 and the touch tool 310. The touch panel 320 obtains a judgment result in Step S320. When the touch panel 320 judges that the sensing area RA is not present in Step S320, the touch panel 320 provides the first uplink signal SUPL1 to the touch sensing electrodes in Step S330. When the touch panel 320 judges that the sensing area RA is present in Step S320, the touch panel 320 provides the first uplink signal SUPL1 to the sensing area RA, and provides the second uplink signal SUPL2 to at least part of the touch sensing electrodes other than the sensing area RA in Step S340. After Steps S330 and S340 end, the touch tool 310 provides the downlink signal SDPL in response to the first uplink signal SUPL1 in Step S350.

Figure 15A:
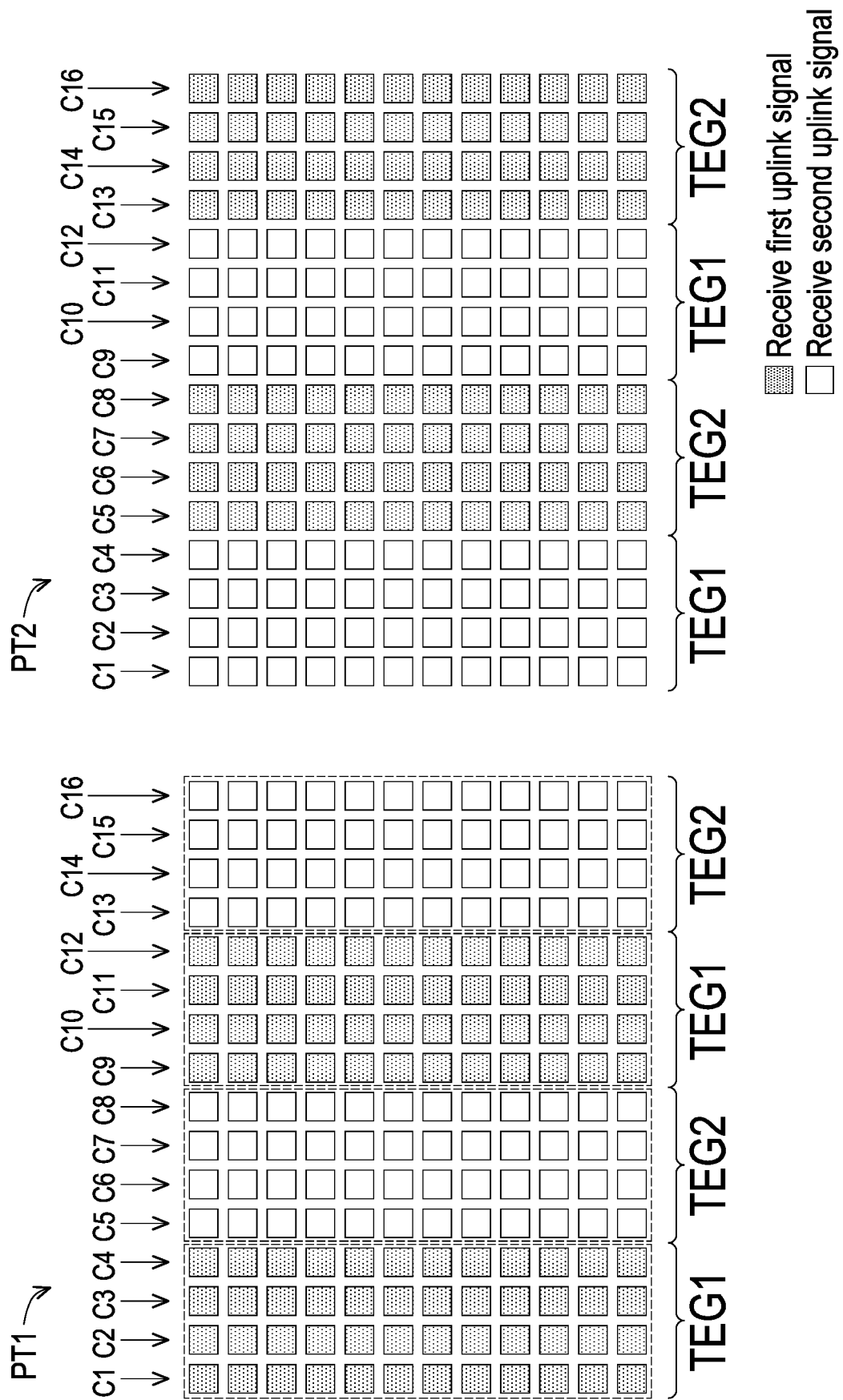
FIG. 15A is a schematic diagram of an operation according to Step S330.

Next, the implementation details of Step S330 will be further illustrated. Please refer to FIG. 13 and FIG. 15A at the same time. FIG. 15A is a schematic diagram of an operation according to Step S330. In the embodiment, the touch sensing electrodes TE of the touch sensing electrode group TEG are grouped into multiple touch sensing electrode sets. Taking the embodiment as an example, electrode columns C1 to C4 and C9 to C12 in the touch sensing electrode group TEG are grouped into a first touch sensing electrode set TEG1. Electrode columns C5 to C8 and C13 to C16 in the touch sensing electrode group TEG are grouped into a second touch sensing electrode set TEG2. In Step S130, the touch panel 320 provides the first uplink signal SUPL1 to the first touch sensing electrode set TEG1 during a period PT1. In addition, the touch panel 320 also provides the second uplink signal SUPL2 to other touch sensing electrode sets (that is, the second touch sensing electrode set TEG2) during the period PT1. The touch panel 320 provides the first uplink signal SUPL1 to the second touch sensing electrode set TEG2 during a period PT2. In addition, the touch panel 320 also provides the second uplink signal SUPL2 to other touch sensing electrode sets (that is, the first touch sensing electrode set TEG1) during the period PT2. In Step S130, the touch panel 320 executes the operations of the periods PT1 and PT2 in an alternating manner.

Figure 15B:
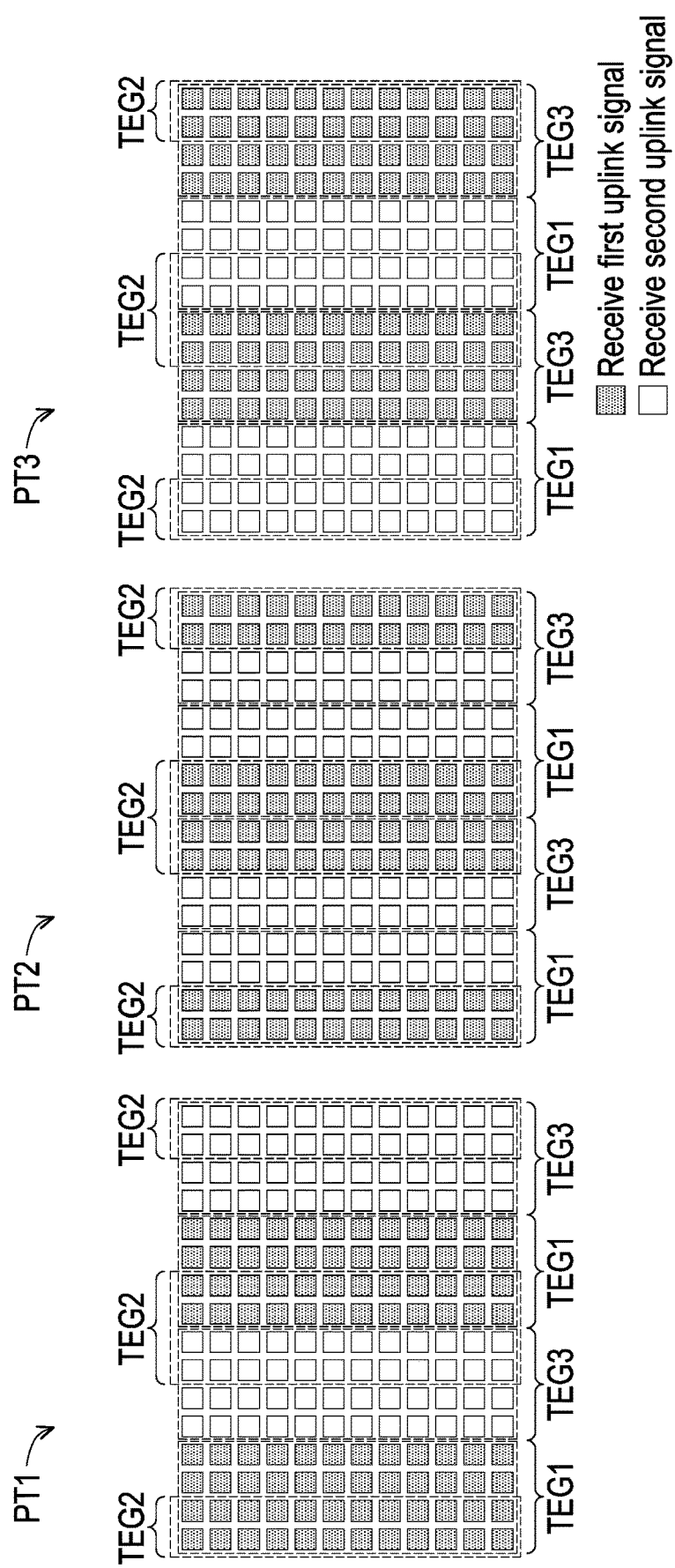
FIG. 15B is a schematic diagram of an operation according to Step S330.

Please refer to FIG. 13 and FIG. 15B at the same time. FIG. 15B is a schematic diagram of an operation according to Step S330. In the embodiment, the touch sensing electrodes TE of the touch sensing electrode group TEG are grouped into multiple touch sensing electrode sets. Taking the embodiment as an example, multiple electrode columns (the electrode columns C1 to C4 and C9 to C12 shown in FIG. 15A) in the touch sensing electrode group TEG are grouped into the first touch sensing electrode set TEG1. Multiple electrode columns (the electrode columns C1, C2, C7 to C10, C15, and C16 shown in FIG. 15A) in the touch sensing electrode group TEG are grouped into the second touch sensing electrode set TEG2. Multiple electrode columns (the electrode columns C5 to C8 and C13 to C16 shown in FIG. 15A) in the touch sensing electrode group TEG are grouped into a third touch sensing electrode set TEG3. In Step S130, the touch panel 320 provides the first uplink signal SUPL1 to the first touch sensing electrode set TEG1 during the period PT1. In addition, the touch panel 320 also provides the second uplink signal SUPL2 to the touch sensing electrodes other than the first touch sensing electrode set TEG1 (that is, the third touch sensing electrode set TEG3) during the period PT1. The touch panel 320 provides the first uplink signal SUPL1 to the second touch sensing electrode set TEG2 during the period PT2. In addition, the touch panel 320 also provides the second uplink signal SUPL2 to the touch sensing electrodes other than the second touch sensing electrode set TEG2 during the period PT2. The touch panel 320 provides the first uplink signal SUPL1 to the third touch sensing electrode set TEG1 during a period PT3. In addition, the touch panel 320 may also provide the second uplink signal SUPL2 to the second touch sensing electrode set TEG2, and provide the first uplink signal SUPL1 to the touch sensing electrodes other than the second touch sensing electrode set TEG2 during the period PT2. In Step S130, the touch panel 320 executes the operations of the periods PT1 to PT3 in an alternating manner.

Figure 16:
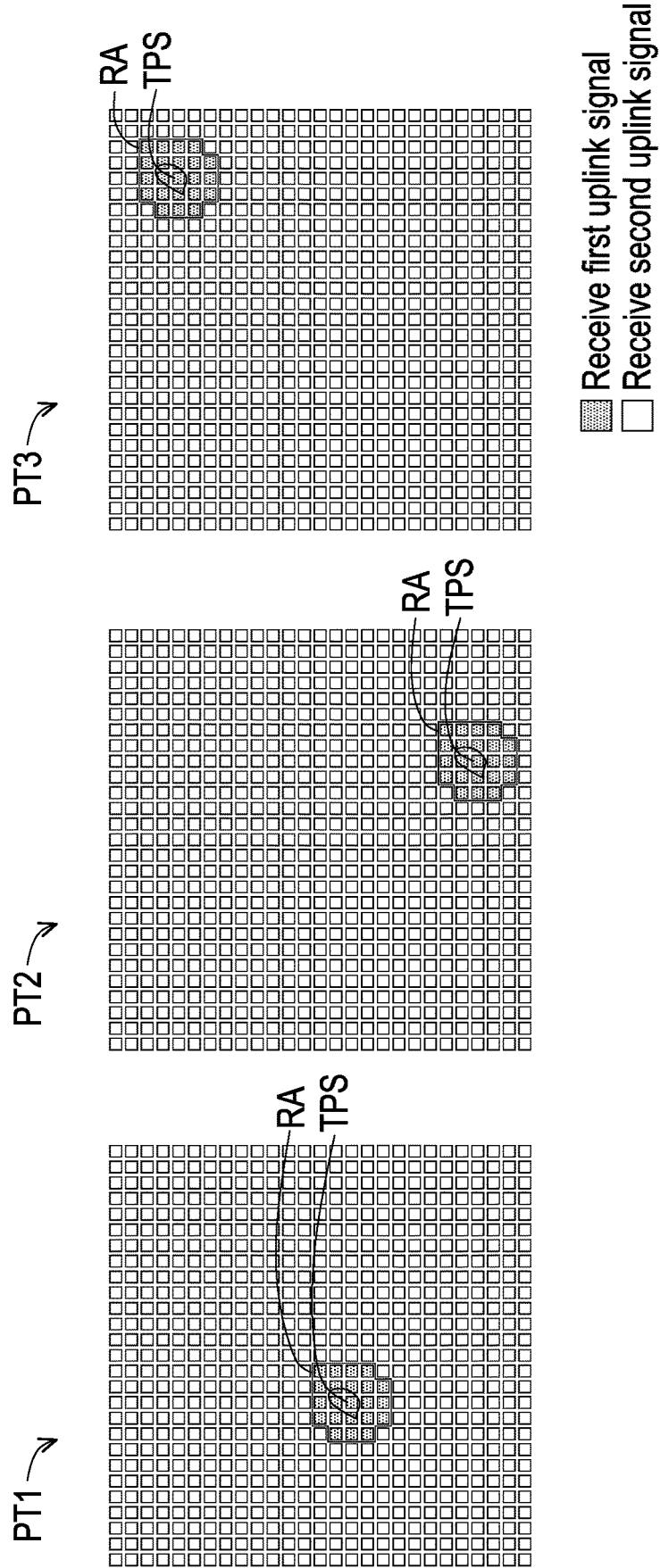
FIG. 16 is a schematic diagram of an operation according to Step S340.

Next, the implementation details of Step S340 will be further illustrated. Please refer to FIG. 13 and FIG. 16 at the same time. FIG. 16 is a schematic diagram of an operation according to Step S340. In the embodiment, when the downlink signal SDPL is received through the touch sensing electrode group TEG, the touch panel 320 defines the sensing area RA according to a sensing position TPS receiving the downlink signal SDPL. In the embodiment, the sensing area RA is greater than the range of the sensing position TPS. In the embodiment, the touch panel 320 may define the position of the sensing area RA according to the sensing position TPS receiving the downlink signal SDPL. Therefore, the position of the sensing area RA can follow the sensing position TPS, as shown by the operations of the periods PT1 to PT3.

It is worth mentioning here that when the sensing area RA is present, the touch panel 320 provides the first uplink signal SUPL1 to the sensing area RA and provides the second uplink signal SUPL2 to the other areas other than the sensing area RA. The first uplink signal SUPL1 is different from the second uplink signal SUPL2. The touch tool 310 provides the downlink signal SDPL according to the first uplink signal SUPL1. In this way, the touch tool 310 is not interfered by the second uplink signal SUPL2 and can maintain the analysis ability for the first uplink signal SUPL1.

Figure 17:
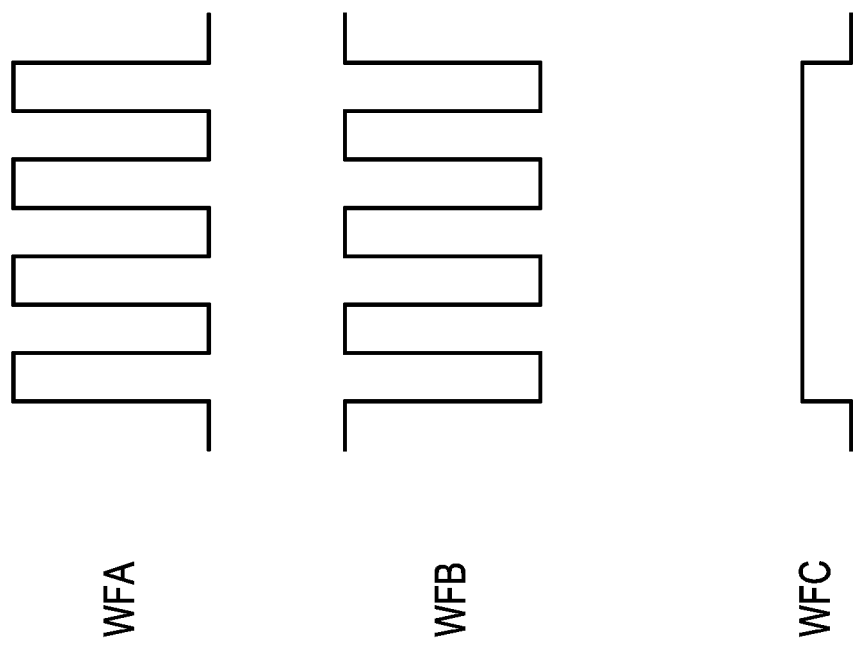
FIG. 17 is a waveform diagram of an uplink signal according to an embodiment of the disclosure.

Please refer to FIG. 13 and FIG. 17 at the same time. FIG. 17 is a waveform diagram of an uplink signal according to an embodiment of the disclosure. In the embodiment, FIG. 17 shows multiple waveforms WFA to WFC of uplink signals. The waveform WFA includes multiple pulse waves. The pulse widths of the pulses of the waveform WFA may be the same or not completely the same. The disclosure is not limited to the pulse widths. The waveform WFB includes multiple pulse waves. The phase of the waveform WFB is opposite to the phase of the waveform WFA. In some embodiments, when the waveform WFA does not have positive pulses, the waveform WFB has positive pulses. When the waveform WFA has positive pulses, the waveform WFB does not have positive pulses. In some embodiments, the waveform WFA includes multiple positive pulses. The waveform WFB includes multiple negative pulses. When the waveform WFA has positive pulses, the waveform WFB has negative pulses. In the embodiment, the waveform WFC has a fixed voltage value.

In the embodiment, when the sensing area RA is not present, the touch panel 320 provides the first uplink signal SUPL1 with the waveform WFA. In some embodiments, when the sensing area RA is not present, the touch panel 320 provides the first uplink signal SUPL1 with the waveform WFC.

On the other hand, when the sensing area RA is present, the touch panel 320 provides the first uplink signal SUPL1 with the waveform WFA to the sensing area RA, and provides the second uplink signal SUPL2 with the waveform WFB to the other areas other than the sensing area RA. In some embodiments, when the sensing area RA is present, the touch panel 320 provides the first uplink signal SUPL1 with the waveform WFA to the sensing area RA, and provides the second uplink signal SUPL2 with the waveform WFC to the other areas other than the sensing area RA.

Please refer to FIG. 13 and FIG. 4 at the same time. In the embodiment, the touch panel 320 may be implemented by the form of the touch panel 220. Similar to the touch panel 220, the touch panel 320 includes the touch sensing electrodes TE, the conversion circuit 221, the touch controller 222, and the uplink signal controller 223. The touch sensing electrodes TE form the touch sensing electrode group TEG. The conversion circuit 221 is connected to the touch sensing electrodes TE. The touch controller 222 is connected to the conversion circuit 221. The touch controller 222 receives the downlink signal SDNL through the touch sensing electrodes TE and the conversion circuit 221 during the downlink period, and judges whether the sensing area RA is present according to the downlink signal SDNL. Further, the conversion circuit 221 can judge the sensing area with the downlink signal SDNL as the sensing area RA.

In the embodiment, the uplink signal controller 223 is connected to the conversion circuit 221. The uplink signal controller 223 at least generates the first uplink signal SUPL1 during the uplink period.

During the uplink period, the uplink signal controller 223, for example, provides at least one of the first uplink signal SUPL1 and the second uplink signal SUPL2 in response to the control signal SC provided by the touch controller 222.

For example, when the touch controller 222 determines that the sensing area RA is not present, the touch controller 222 controls the uplink signal controller 223 to generate the first uplink signal SUPL1 during the uplink period. The touch controller 222 also controls the uplink period conversion circuit 221 to provide the first uplink signal SUPL1 to all the touch sensing electrodes TE.

For example, when the touch controller 222 determines that the sensing area RA is present, the touch controller 222 controls the uplink signal controller 223 to generate the first uplink signal SUPL1 and the second uplink signal SUPL2 during the uplink period. When the sensing area RA is present, the touch controller 222 also controls the conversion circuit 221 to provide the first uplink signal SUPL1 to at least one touch sensing electrode TE corresponding to the sensing area RA, and provide the second uplink signal SUPL2 to at least one touch sensing electrode TE corresponding to other areas.

In the embodiment, the conversion circuit 221 alternately performs the above operations based on the downlink period and the uplink period. The conversion circuit 221 may be a channel conversion circuit.

Figure 18:
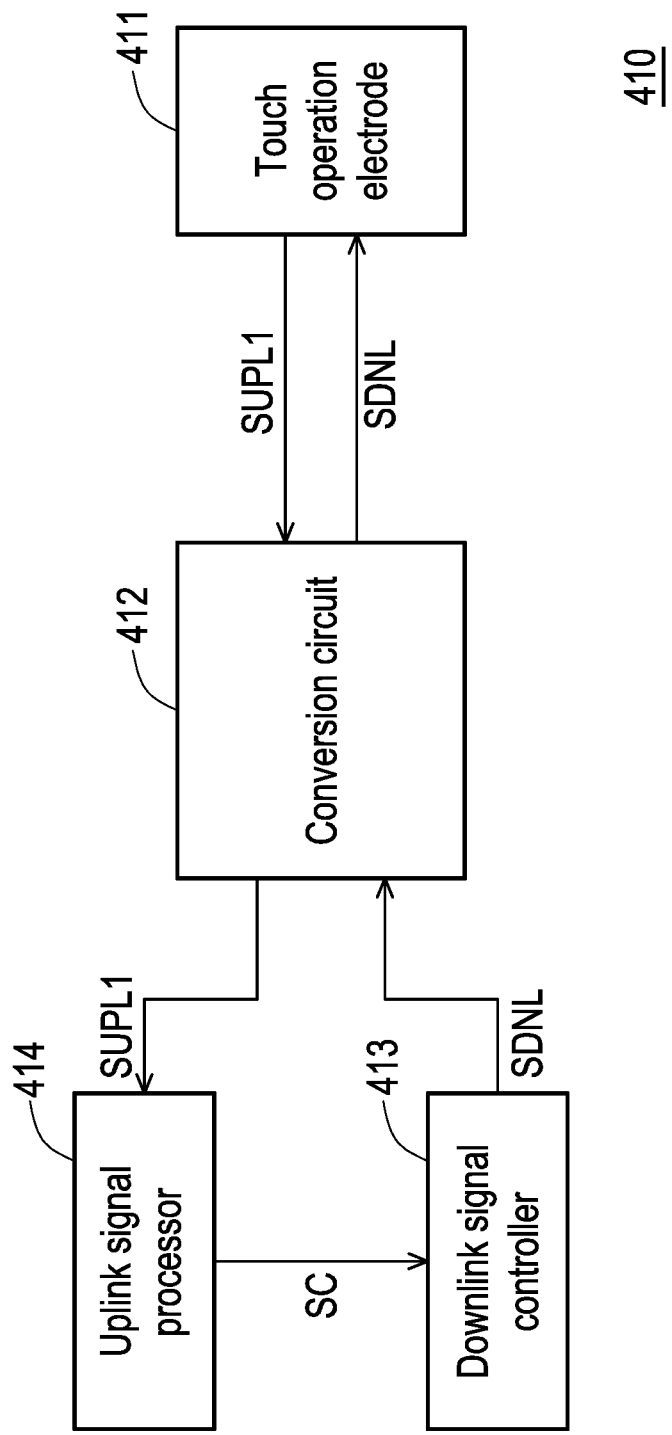
FIG. 18 is a schematic diagram of a touch tool according to an embodiment of the disclosure.

Please refer to FIG. 13 and FIG. 18 at the same time. FIG. 18 is a schematic diagram of a touch tool according to an embodiment of the disclosure. In the embodiment, a touch tool 410 includes a touch operation electrode 411, a conversion circuit 412, and a downlink signal controller 413. The conversion circuit 412 is connected to the touch operation electrode 411. The downlink signal controller 413 is connected to the conversion circuit 412. The downlink signal controller 413 generates the downlink signal SDNL during the downlink period, and provides the downlink signal SDNL to the touch operation electrode 411 through the conversion circuit 412. The conversion circuit 412 receives the first uplink signal SUPL1 through the touch operation electrode 411 during the uplink period.

In the embodiment, the touch tool 410 further includes an uplink signal processor 414. The uplink signal processor 414 is connected to the conversion circuit 412 and the downlink signal controller 413. The uplink signal processor 414 controls the downlink signal controller 413 to generate the downlink signal SDNL according to the first uplink signal SUPL1.

In the embodiment, the conversion circuit 412 alternately performs the above operations based on the downlink period and the uplink period. The conversion circuit 412 may be a channel conversion circuit.

In the embodiment, the uplink signal processor 414 can identify the waveform of the first uplink signal SUPL1. Therefore, the uplink signal processor 414 is not interfered by uplink signals with other waveforms and can maintain the analysis ability for the first uplink signal SUPL1.

Figure 19A:
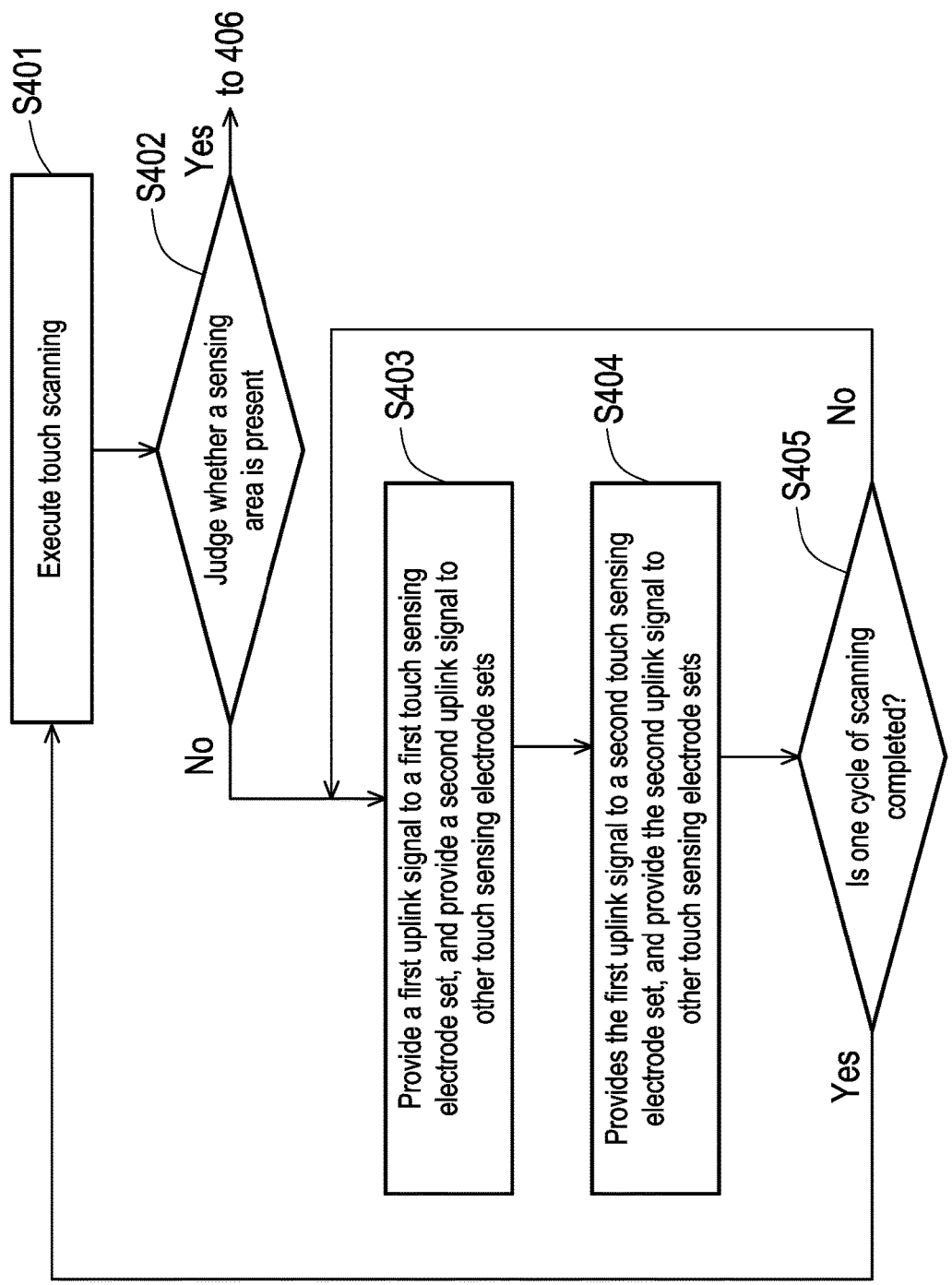
FIG. 19A and FIG. 19B are flowcharts of an operation method according to an embodiment of the disclosure.
Figure 19B:
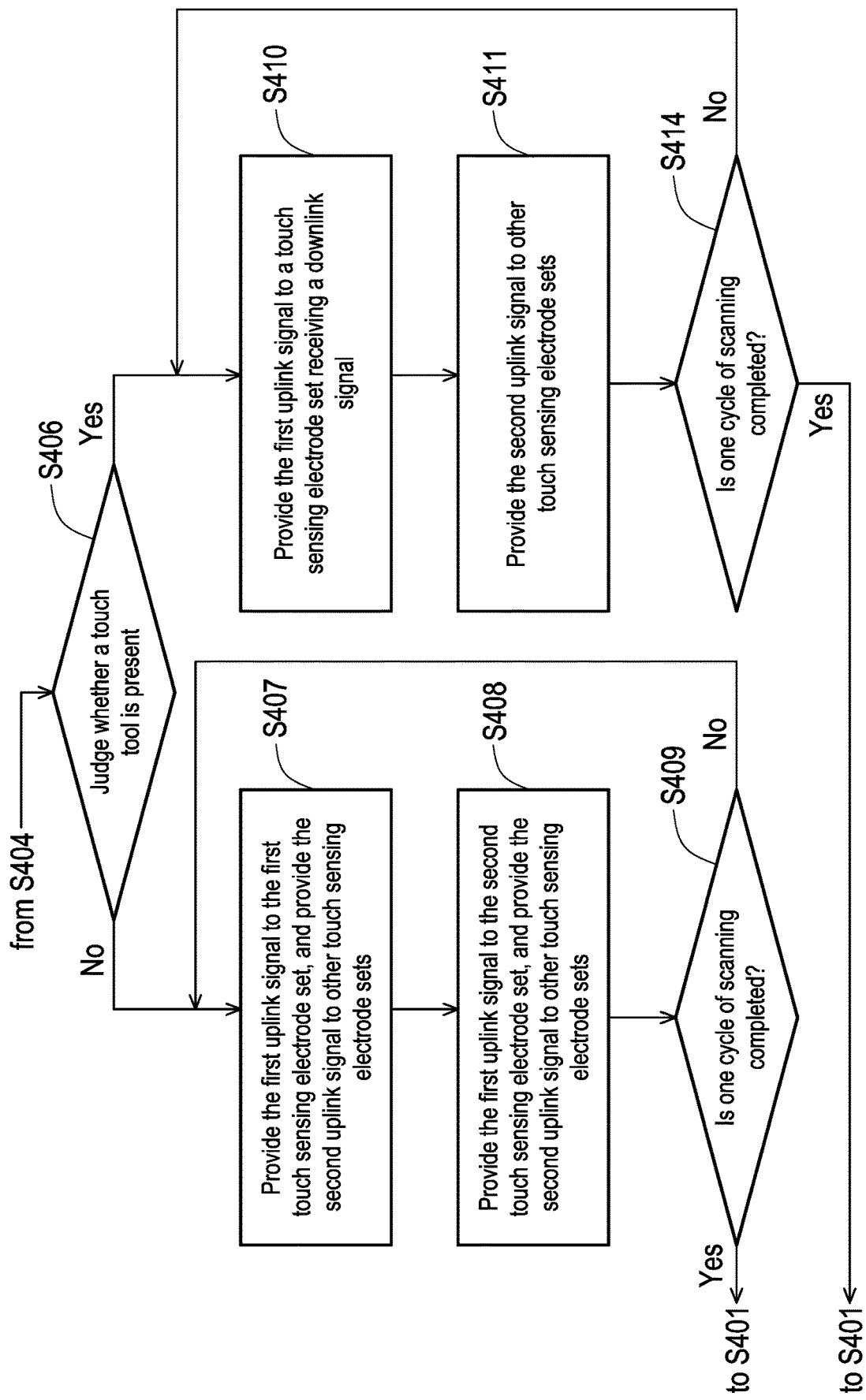

Please refer to FIG. 13, FIG. 19A, and FIG. 19B at the same time. FIG. 19A and FIG. 19B are flowcharts of an operation method according to an embodiment of the disclosure. In the embodiment, the operation method is applicable to the touch panel 320. In Step S401, the touch panel 320 starts a column touch scanning operation. In Step S402, the touch panel 320 judges whether the sensing area is present. When the sensing area is not present, it means that the touch panel 320 does not receive any downlink signal. Therefore, the touch panel 320 provides the first uplink signal to the first touch sensing electrode set (for example, the first touch sensing electrode set TEG1 of FIG. 15A), and provides the second uplink signal SUPL2 to other touch sensing electrode sets (for example, the second touch sensing electrode set TEG2 of FIG. 15A) in Step S403. The touch panel 320 provides the first uplink signal SUPL1 to the second touch sensing electrode set, and provides the second uplink signal SUPL2 to other touch sensing electrode sets in Step S404.

In Step S405, the touch panel 320 judges whether the operations of Steps S403 and S404 have completed one cycle of scanning. For example, the "one cycle" includes one or more operations of Steps S403 and S404. When the number of executions of Steps S403 and S404 are insufficient, it means that the one cycle of scanning has not been completed. Therefore, the touch panel 320 returns to the operation of Step S403. On the other hand, when the number of executions of Steps S403 and S404 are sufficient, it means that the one cycle of scanning has been completed. Therefore, the touch panel 320 returns to the operation of Step S401.

In Step S402, when the touch panel 320 judges that the sensing area is present, the touch panel 320 judges whether the touch tool 310 is present in Step S406. For example, the touch panel 320 identifies the received downlink signal. When the downlink signal received by the touch panel 320 is not the downlink signal SDPL provided by the touch tool 310, the touch panel 320 judges that the touch tool 310 is not present. Therefore, the touch panel 320 provides the first uplink signal SUPL1 to the first touch sensing electrode set, and provides the second uplink signal SUPL2 to other touch sensing electrode sets in Step S407. The touch panel 320 provides the first uplink signal SUPL1 to the second touch sensing electrode set, and provides the second uplink signal SUPL2 to other touch sensing electrode sets in Step S408. The touch panel 320 judges whether the operations of Steps S407 and S408 have completed the one cycle of scanning.

In Step S409, the touch panel 320 judges whether the operations of Steps S407 and S408 have completed the one cycle of scanning. Similar to Step S405, when the number of executions of Steps S407 and S408 are insufficient, the touch panel 320 returns to the operation of Step S407. On the other hand, when the number of executions of Steps S407 and S408 are sufficient, the touch panel 320 returns to the operation of Step S401.

In the embodiment, the operations of Steps S403, S404, S407, and S408 may be sufficiently taught at least in the embodiments of FIG. 13 and FIG. 15A, so there will be no repetition.

In Step S406, when the touch panel 320 identifies the downlink signal SDPL provided by the touch tool 310, the touch panel 320 judges that the sensing area RA is present. Therefore, the touch panel 320 provides the first uplink signal SUPL1 to the touch sensing electrode set receiving the downlink signal SDPL in Step S410, and provides the second uplink signal to other touch sensing electrode sets in Step S411. In Step S412, the touch panel 320 judges whether the operations of Steps S410 and S411 have completed the one cycle of scanning. Similar to Steps S405 and S409, when the number of executions of Steps S410 and S411 are insufficient, the touch panel 320 returns to the operation of Step S410. On the other hand, when the number of executions of Steps S410 and S411 are sufficient, the touch panel 320 returns to the operation of Step S401.

Figure 20:
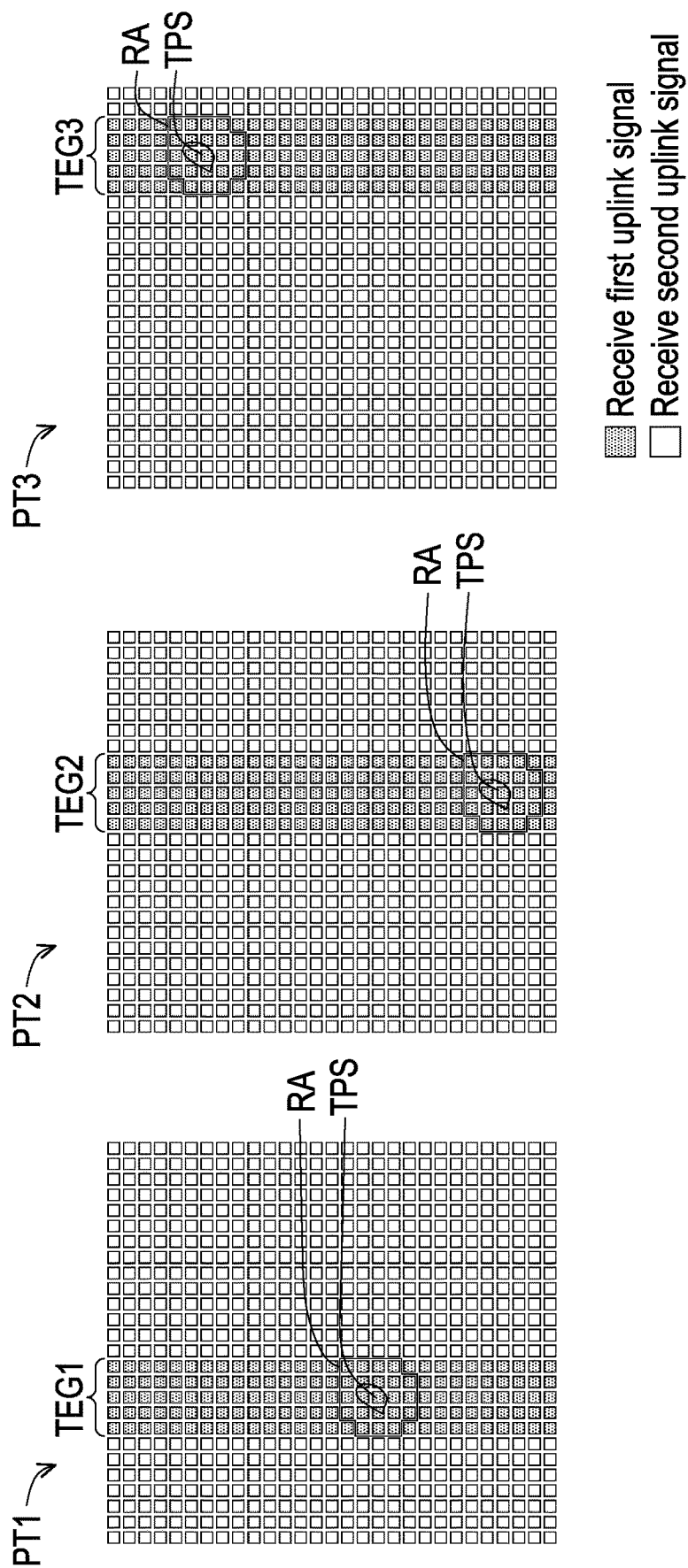
FIG. 20 is a schematic diagram of an operation according to Steps S410 and S411.

To illustrate the operations of Steps S410 and S411, FIG. 20 is a schematic diagram of an operation according to Steps S410 and S411. In the embodiment, during the period PT1, the touch panel 320 judges that at least one touch sensing electrode of the first touch sensing electrode set TEG1 receives the downlink signal SDPL. Therefore, the touch panel 320 provides the first uplink signal SUPL1 to all the touch sensing electrodes of the first touch sensing electrode set TEG1. The sensing area RA is located in the range of the first touch sensing electrode set TEG1. The touch panel 320 provides the second uplink signal SUPL2 to other touch sensing electrode sets other than the first touch sensing electrode set TEG1. During the period PT2, the touch panel 320 judges that at least one touch sensing electrode of the second touch sensing electrode set TEG2 receives the downlink signal SDPL. The sensing area RA is located in the range of the second touch sensing electrode set TEG2. Therefore, the touch panel 320 provides the first uplink signal SUPL1 to all the touch sensing electrodes of the second touch sensing electrode set TEG2. The touch panel 320 provides the second uplink signal SUPL2 to other touch sensing electrode sets other than the second touch sensing electrode set TEG2. During the period PT3, the touch panel 320 judges that at least one touch sensing electrode of the third touch sensing electrode set TEG3 receives the downlink signal SDPL. The sensing area RA is located in the range of the third touch sensing electrode set TEG3. Therefore, the touch panel 320 provides the first uplink signal SUPL1 to all the touch sensing electrodes of the third touch sensing electrode set TEG3. The touch panel 320 provides the second uplink signal SUPL2 to other touch sensing electrode sets other than the third touch sensing electrode set TEG3.

Figure 21:
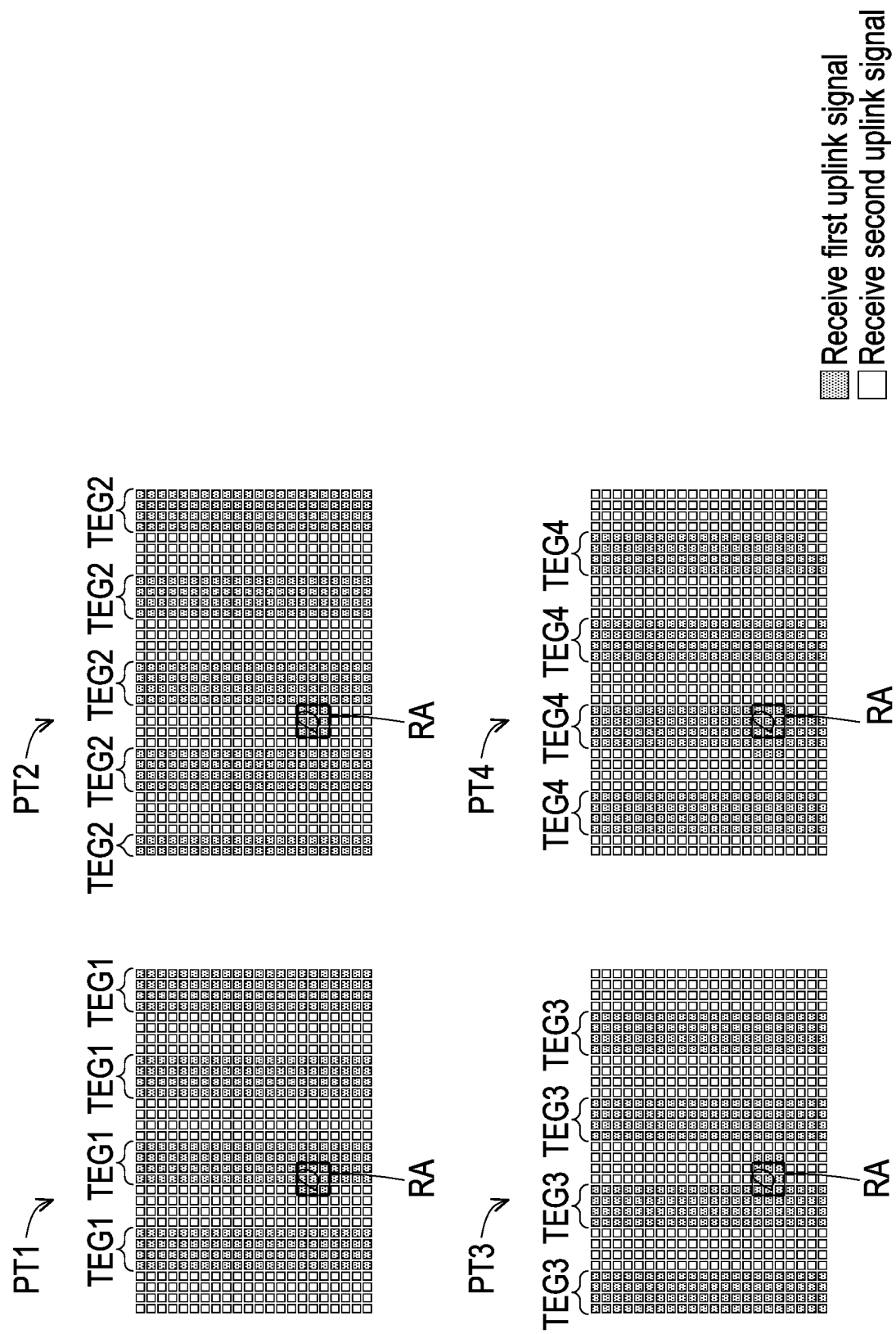
FIG. 21 is a schematic diagram of an operation according to an embodiment of the disclosure.

Please refer to FIG. 14 and FIG. 21. FIG. 21 is a schematic diagram of an operation according to an embodiment of the disclosure. In the embodiment, the touch sensing electrodes are grouped into the first touch sensing electrode set TEG1, the second touch sensing electrode set TEG2, the third touch sensing electrode set TEG3, and a fourth touch sensing electrode set TEG4 (the disclosure is not limited thereto). The first touch sensing electrode set TEG1, the second touch sensing electrode set TEG2, the third touch sensing electrode set TEG3, and the fourth touch sensing electrode set TEG4 partially overlap. In other words, the same touch sensing electrode may belong to at least two touch sensing electrode sets. In the embodiment, when the touch panel 320 judges that the sensing area RA is present in Step S320, the touch panel 320 provides the first uplink signal SUPL1 to the sensing area RA in Step S340. In addition, during the period PT1 of Step S340, the touch panel 320 provides the first uplink signal SUPL1 to the first touch sensing electrode set TEG1, and provides the second uplink signal SUPL2 to other touch sensing electrodes other than the first touch sensing electrode set TEG1. During the period PT2 of Step S340, the touch panel 320 provides the first uplink signal SUPL1 to the second touch sensing electrode set TEG2, and provides the second uplink signal SUPL2 to other touch sensing electrodes other than the second touch sensing electrode set TEG2. During the period PT3 of Step S340, the touch panel 320 provides the first uplink signal SUPL1 to the third touch sensing electrode set TEG3, and provides the second uplink signal SUPL2 to other touch sensing electrodes other than the third touch sensing electrode set TEG3. During a period PT4 of Step S340, the touch panel 320 provides the first uplink signal SUPL1 to the fourth touch sensing electrode set TEG4, and provides the second uplink signal SUPL2 to other touch sensing electrodes other than the fourth touch sensing electrode set TEG4.

In summary, the touch panel obtains the first sensing area sensed with the touch tool and the second sensing area other than the first sensing area according to the downlink signal provided by the touch tool. The touch panel provides the first uplink signal to the first sensing area and provides the second uplink signal to the second sensing area. The touch tool generates the calculated uplink signal according to the first uplink signal and the second uplink signal, and provides the downlink signal according to the calculated uplink signal. In this way, the touch tool can maintain the analysis ability for the uplink signal.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A touch system, comprising:
 a touch tool, configured to provide a downlink signal; and
 a touch panel, configured to obtain a first sensing area sensed with the touch tool and a second sensing area other than the first sensing area according to the downlink signal, provide a first uplink signal to the first sensing area, and provide a second uplink signal to the second sensing area,
 wherein the first uplink signal is different from the second uplink signal,
 wherein the touch tool generates a calculated uplink signal according to the first uplink signal and the second uplink signal, and provides the downlink signal according to the calculated uplink signal,
 wherein the touch panel comprises a plurality of touch sensing electrodes,
 wherein the touch panel provides the first uplink signal to at least one touch sensing electrode corresponding to the first sensing area among the touch sensing electrodes, and provides the second uplink signal to at least one touch sensing electrode corresponding to the second sensing area among the touch sensing electrodes, and
 wherein when a position of the first sensing area is obtained and the second sensing area is not present is obtained, the touch panel provides the first uplink signal to the first sensing area, and provides a third uplink signal to other areas other than the first sensing area, wherein a phase of the third uplink signal is opposite to a phase of the first uplink signal.

2. The touch system according to claim 1, wherein the touch panel comprises:
 a conversion circuit, connected to the touch sensing electrodes;
 a touch controller, connected to the conversion circuit and configured to receive the downlink signal through the touch sensing electrodes and the conversion circuit during a downlink period, and obtain the first sensing area and the second sensing area according to the downlink signal; and
 an uplink signal controller, connected to the conversion circuit and configured to generate at least one of the first uplink signal and the second uplink signal during an uplink period.

3. The touch system according to claim 1, wherein the touch tool comprises:
 a touch operation electrode;
 a conversion circuit, connected to the touch operation electrode;
 a downlink signal controller, connected to the conversion circuit and configured to generate the downlink signal during a downlink period, and provide the downlink signal to the touch operation electrode through the conversion circuit; and
 an uplink signal processor, connected to the conversion circuit and the downlink signal controller, and configured to control the downlink signal controller to generate the downlink signal according to the calculated uplink signal, wherein the conversion circuit receives the first uplink signal through the touch operation electrode during an uplink period, receives the second uplink signal through a coupling manner, and generates the calculated uplink signal according to the first uplink signal and the second uplink signal.

4. The touch system according to claim 3, wherein the conversion circuit comprises:
a comparator, wherein a non-inverting input terminal of the comparator receives the first uplink signal through the touch operation electrode, an inverting input terminal of the comparator receives the second uplink signal, and an output terminal of the comparator is used to output the calculated uplink signal.

5. The touch system according to claim 1, wherein the touch tool subtracts the second uplink signal from the first uplink signal to generate the calculated uplink signal.

6. The touch system according to claim 1, wherein an amplitude of the third uplink signal is smaller than an amplitude of the first uplink signal.

7. The touch system according to claim 1, wherein when a position of the second sensing area is obtained and the first sensing area is not present is obtained, the touch panel provides the second uplink signal to the second sensing area, and provides a third uplink signal to other areas other than the second sensing area, wherein a phase of the second uplink signal is opposite to a phase of the first uplink signal.

8. The touch system according to claim 7, wherein an amplitude of the third uplink signal is smaller than an amplitude of the second uplink signal.

9. The touch system according to claim 1, wherein when a position of the first sensing area and a position of the second sensing area are obtained, the touch panel provides the first uplink signal to the first sensing area, provides the second uplink signal to the second sensing area, and provides a third uplink signal to other areas other than the first sensing area and the second sensing area.

10. The touch system according to claim 1, wherein an amplitude of the second uplink signal is smaller than an amplitude of the first uplink signal.

11. The touch system according to claim 1, wherein a phase of the second uplink signal is opposite to a phase of the first uplink signal.

12. A touch system, comprising:
a touch tool, configured to provide a downlink signal according to a first uplink signal; and
a touch panel, comprising a plurality of touch sensing electrodes, wherein the touch panel judges whether a sensing area sensed with the touch tool is present according to the downlink signal,
wherein when the sensing area is not present, the touch panel uses the first uplink signal to scan the touch sensing electrodes,
wherein when the sensing area is present, the touch panel provides the first uplink signal to the sensing area, and provides a second uplink signal to at least part of the touch sensing electrodes other than the sensing area,
wherein the first uplink signal is different from the second uplink signal,
wherein the touch sensing electrodes of the touch panel are grouped into a plurality of touch sensing electrode sets, and
wherein when the sensing area is not present, the touch panel sequentially provides the first uplink signal to one of the touch sensing electrode sets, and provides the second uplink signal to other touch sensing electrode sets.

13. The touch system according to claim 12, wherein when the sensing area is not present, the first uplink signal comprises a plurality of pulse waves or has a fixed voltage value.

14. The touch system according to claim 12, wherein when the sensing area is present, the first uplink signal comprises a plurality of pulse waves, and the second uplink signal comprises a plurality of pulse waves and has a phase opposite to a phase of the first uplink signal, or has a fixed voltage value.

15. The touch system according to claim 12, wherein when the downlink signal is received, the touch panel provides the first uplink signal to the sensing area.

16. The touch system according to claim 12, wherein when the downlink signal is received, the touch panel provides the first uplink signal to a touch sensing electrode set receiving the downlink signal.

17. The touch system according to claim 12, wherein when the downlink signal is received, the touch panel provides the first uplink signal to the sensing area, sequentially provides the first uplink signal to one of the touch sensing electrode sets, and provides the second uplink signal to other touch sensing electrode sets.

18. The touch system according to claim 12, wherein the touch panel comprises:
a plurality of touch sensing electrodes;
a conversion circuit, coupled to the touch sensing electrodes;
a touch controller, coupled to the conversion circuit and configured to receive the downlink signal through the touch sensing electrodes and the conversion circuit during a first period, and obtain the sensing area and other areas according to the downlink signal; and
an uplink signal controller, coupled to the conversion circuit and configured to at least generate the first uplink signal during a second period,
wherein the conversion circuit provides the first uplink signal to a plurality of first touch sensing electrodes corresponding to the sensing area among the touch sensing electrodes, and provides the second uplink signal to a plurality of second touch sensing electrodes corresponding to the other areas among the touch sensing electrodes.

\* \* \* \* \*